United States Patent
Gotmalm et al.

(10) Patent No.: US 11,067,049 B2
(45) Date of Patent: Jul. 20, 2021

(54) AUXILIARY POWER SYSTEM FOR VEHICLE

(71) Applicant: INPS ENVIRONMETNAL PRODUCTS INC., London (CA)

(72) Inventors: Christer Gotmalm; James Mancuso, Burlington (CA)

(73) Assignee: INPS ENVIRONMETNAL PRODUCTS INC., London (CA)

( * ) Notice: Subject to any disclaimer, the term of this patent is extended or adjusted under 35 U.S.C. 154(b) by 76 days.

(21) Appl. No.: 15/779,404

(22) PCT Filed: Nov. 24, 2016

(86) PCT No.: PCT/CA2016/051378
§ 371 (c)(1),
(2) Date: May 25, 2018

(87) PCT Pub. No.: WO2017/088057
PCT Pub. Date: Jun. 1, 2017

(65) Prior Publication Data
US 2018/0306159 A1    Oct. 25, 2018

Related U.S. Application Data

(63) Continuation of application No. PCT/CA2016/051378, filed on Nov. 24, 2016.

(30) Foreign Application Priority Data

Nov. 27, 2015 (CA) ...................... 2914185

(51) Int. Cl.
*F02N 11/08* (2006.01)
*B61C 17/04* (2006.01)
(Continued)

(52) U.S. Cl.
CPC ............ *F02N 11/0837* (2013.01); *B61C 5/00* (2013.01); *B61C 15/00* (2013.01); *B61C 17/04* (2013.01);
(Continued)

(58) Field of Classification Search
CPC ....... F02N 11/0837; F02N 19/10; B61C 5/00; B61C 15/00; B61C 17/04; B61C 17/06;
(Continued)

(56) References Cited

U.S. PATENT DOCUMENTS 1,669,162 A  *  5/1928  Forsberg ................... B60L 9/10
                                                        310/113
1,948,752 A  *  2/1934  Freeman .................... H02P 9/00
                                                        290/17

(Continued)

FOREIGN PATENT DOCUMENTS

CA   WO0240845      *  5/2002  ............. F01M 5/021
CN     201332295    * 10/2009  ............... G05F 1/10
(Continued)

*Primary Examiner* — Hung Q Nguyen
*Assistant Examiner* — Anthony Donald Taylor, Jr.
(74) *Attorney, Agent, or Firm* — Erickson Kernell IP, LLC; Kent R. Erickson

(57) ABSTRACT

Conventional APUs for diesel-electric locomotives may include an AC electric generator and typically require additional hardware to be installed to convert the AC power output by the generator to DC power that can power electrical systems or charge batteries in the locomotive. According to some embodiments, there is provided an auxiliary power unit (APU) or system for operation in cooperation with a primary engine. The APU includes a secondary engine; a primary engine coolant heating system, or a primary engine lubricant heating system; a control system that automatically shuts down the primary engine and starts the secondary engine responsive to a predetermined condition; and a Direct Current (DC) power generator that gen- (Continued)

erates an output voltage, the DC power generator being driven by the secondary engine.

42 Claims, 12 Drawing Sheets

(51) Int. Cl.
    *B61C 17/06*         (2006.01)
    *B61C 17/12*         (2006.01)
    *B61L 15/00*         (2006.01)
    *B61C 5/00*          (2006.01)
    *B61C 15/00*         (2006.01)
    *B61C 7/04*          (2006.01)
    *F01M 5/02*          (2006.01)
    *F02N 19/10*         (2010.01)
    *H02P 9/04*          (2006.01)

(52) U.S. Cl.
    CPC .............. *B61C 17/06* (2013.01); *B61C 17/12* (2013.01); *B61L 15/0081* (2013.01); *B61C 7/04* (2013.01); *F01M 5/021* (2013.01); *F02N 19/10* (2013.01); *H02P 9/04* (2013.01); *Y02T 30/00* (2013.01)

(58) Field of Classification Search
    CPC ....... B61C 17/12; B61C 7/04; B61L 15/0081; F01M 5/021; H02P 9/04; Y02T 30/18
    USPC ...................................................... 123/179.4
    See application file for complete search history.

(56) References Cited

U.S. PATENT DOCUMENTS

| | | | | |
|---|---|---|---|---|
| 2,113,207 A | * | 4/1938 | Yingling | H02P 9/00 290/3 |
| 2,815,974 A | | 12/1957 | Stubbe | |
| 3,547,044 A | * | 12/1970 | Lemaire | B60M 1/28 105/1.4 |
| 3,724,430 A | * | 4/1973 | Adler | F02D 31/007 123/357 |
| 4,424,775 A | * | 1/1984 | Mayfield, Jr. | F01M 5/001 123/142.5 R |
| 4,611,466 A | * | 9/1986 | Keedy | B60H 1/03 123/142.5 R |
| 4,711,204 A | * | 12/1987 | Rusconi | F01P 3/20 122/26 |
| 5,072,703 A | * | 12/1991 | Sutton | F02N 11/0803 123/179.4 |
| 5,170,065 A | * | 12/1992 | Shimizu | F02D 29/06 290/40 A |
| 5,429,089 A | * | 7/1995 | Thornberg | F02D 31/001 123/352 |
| 6,470,844 B2 | * | 10/2002 | Biess | F01M 5/021 123/142.5 R |
| 7,309,929 B2 | * | 12/2007 | Donnelly | B60L 7/06 290/4 R |
| 8,972,152 B2 | * | 3/2015 | Boesch | F02N 11/0837 123/179.2 |
| 2002/0189564 A1 | * | 12/2002 | Biess | F01M 5/021 123/142.5 R |
| 2004/0050368 A1 | * | 3/2004 | Kitagawa | F02D 41/064 123/480 |
| 2005/0035657 A1 | * | 2/2005 | Brummett | B60H 1/3226 307/10.1 |
| 2005/0199210 A1 | * | 9/2005 | Biess | F01M 5/021 123/179.19 |
| 2009/0272353 A1 | * | 11/2009 | Gates | F02N 15/10 123/142.5 R |
| 2014/0012446 A1 | * | 1/2014 | Kumar | B60W 20/00 701/22 |

FOREIGN PATENT DOCUMENTS

| | | |
|---|---|---|
| CN | 101977007 | 7/2012 |
| WO | 02/40845 A2 | 5/2002 |
| WO | 2010002978 A2 | 1/2010 |

* cited by examiner

AUXILIARY POWER SYSTEM FOR VEHICLE

RELATED APPLICATION

This application claims priority to Canadian Application Serial No. 2,914,185 filed Nov. 27, 2015, the entire contents of which are incorporated herein by reference.

FIELD OF THE DISCLOSURE

Some aspects of the disclosure relate to large engine systems, but more specifically to a system and method for supplying auxiliary power to a locomotive engine to permit automatic shutdown of such locomotive engine in all weather conditions.

BACKGROUND

Generally, large diesel engines, such as locomotive engines are not shut down during cold weather conditions due to the difficulty in restarting. Diesel engines do not have the benefit of an electric spark to generate combustion and must rely on heat generated by compressing air to ignite fuel in the engine cylinders. In low temperature conditions (ambient temperatures below about 40° F.), two major factors contribute to the difficulty in starting a diesel engine. First, cold ambient air drawn into the engine must be increased in temperature sufficiently to cause combustion. Second, diesel fuel tends to exhibit poor viscous qualities at low temperatures, making engine starting difficult. Furthermore, engine oil that provides lubrication for the engine is most effective within specific temperature limits, generally corresponding to normal operating temperature of the engine. When cold, the engine lube-oil tends to impede engine starting. Moreover, most engines require a large electrical supply, typically provided by a battery, in order to turn over and start the engine. Unfortunately, batteries are also adversely affected by severe cold weather.

In locomotives of diesel electric type, it is advantageous to use an Auxiliary Power Unit ("APU"). When an operator or automated system shuts down the locomotive main engine, the APU may perform one or more of the following: keep the main engine's liquid cooling system from freezing; keep the main engine's lubricating system pre-lubricated; keep a battery system in the locomotive adequately charged while the main engine is off. Use of an APU may allow for the reduction in main engine running time by commonly 2000 hours per year, which in turn may save approximately 20,000 gallons of fuel per year because the APU engine may be approximately 100 times smaller in output than the main engine. Furthermore, this reduction in main engine hours also reduces engine wear, noise pollution and emissions such as carbon monoxide (CO), carbon dioxide ($CO_2$), nitrous oxide ($NO_x$) and sulfur oxide ($SO_x$).

Conventional APUs for diesel-electric locomotives may include an AC electric generator (i.e. a generator with AC electrical power output) for the purpose of powering various components in the APU (e.g. pumps) and in the locomotive (e.g. air conditioning) and/or to charge batteries. Conventional APUs typically require additional hardware to be installed to convert the AC power output by the generator to DC power that can power such components and systems or charge batteries.

SUMMARY

According to one aspect, there is provided an auxiliary power system for operation in cooperation with a primary engine, comprising: a secondary engine; at least one of: a primary engine coolant heating system driven by the secondary engine; and a primary engine lubricant heating system driven by the secondary engine; a control system that automatically starts the secondary engine responsive to a predetermined condition; and a Direct Current (DC) power generator that generates an output voltage, the DC power generator being driven by the secondary engine.

In some embodiments, the output voltage is matched to an electrical system of a vehicle comprising the primary engine.

In some embodiments, the vehicle is a locomotive.

In some embodiments, the auxiliary power system further comprises a voltage regulator that regulates the output voltage of the DC power generator.

In some embodiments, the voltage regulator is configured to maintain an output voltage of approximately 74 VDC.

In some embodiments, the voltage regulator adjusts an excitation voltage in the DC power generator responsive to the output voltage to regulate the output voltage.

In some embodiments, adjusting the excitation voltage in the DC power generator responsive to the output voltage comprises: increasing the excitation voltage if the output voltage is below a minimum threshold; and decreasing the excitation voltage if the output voltage is above a maximum threshold.

In some embodiments, the auxiliary power system further comprises an engine speed control that maintains an engine speed of the secondary engine based on an engine speed setting, the engine speed setting being adjustable within an engine speed range.

In some embodiments, the engine speed control comprises an engine speed sensor that senses a current engine speed of the secondary engine, and a fuel regulator that increases fuel to the secondary engine if the current engine speed falls below the engine speed setting by a first threshold; and decreases the fuel to the secondary engine if the current engine speed exceeds the engine speed setting by a second threshold.

In some embodiments, the control system comprises a timer, and controls the voltage regulator to delay generating an output voltage until at least one of: a predetermined time elapses after the secondary engine is started; and the engine speed corresponds to the engine speed setting.

In some embodiments, the control system monitors the engine speed of the secondary engine and output voltage of the DC power generator and adapts a maximum permitted output power of the DC power generator responsive to the engine speed and output voltage.

In some embodiments, adapting the maximum permitted output power of the DC power generator responsive to the engine speed and output voltage comprises: decreasing the maximum permitted output power if either the engine speed is below a engine speed threshold or the output voltage is below a voltage threshold; and increasing the maximum permitted output power if the engine speed is above the engine speed threshold and the output voltage is above the voltage threshold for a first predetermined time period.

In some embodiments, the control system further increases the engine speed setting if the maximum permitted output power does not reach a minimum power threshold within a second predetermined time period.

In some embodiments, the auxiliary power system further comprises a temperature sensor coupled to a switch and mountable to an exterior of a vehicle containing the primary engine, wherein the switch is configured to disable automatic shutdown of the primary engine if a temperature sensed by the temperature sensor is below a threshold.

In some embodiments, the switch disables automatic shutdown by disabling an Engine Shutdown Timer (EST) of the vehicle.

In some embodiments, the control system controls the DC power generator to automatically match the output voltage to an electrical system of the vehicle.

According to another aspect, there is provided a vehicle comprising the primary engine and the auxiliary power system as described above or below.

In some embodiments, the vehicle is a locomotive.

In some embodiments, the vehicle further comprises at least one electrical system and a battery bank, wherein the output voltage of the DC power generator is matched to the at least one electrical system and the battery bank of the vehicle.

According to another aspect, there is provided a method for controlling power output of an auxiliary power system that cooperates with a primary engine, the auxiliary power system comprising a secondary engine and a Direct Current (DC) power generator, driven by the secondary engine, that generates an output voltage, the method comprising: monitoring an engine speed of the secondary engine and the output voltage of the DC power generator; and adapting a maximum permitted output power of the DC power generator responsive to the engine speed and output voltage.

In some embodiments, adapting the maximum permitted output power of the DC power generator responsive to the engine speed and output voltage comprises: decreasing the maximum permitted output power if either the engine speed is below an engine speed threshold or the output voltage is below a voltage threshold; and increasing the maximum permitted output power if the engine speed is above the engine speed threshold and the output voltage is above the voltage threshold for a first predetermined time period.

In some embodiments, the method further comprises: increasing the engine speed setting of the secondary engine if the maximum permitted output power does not reach a power threshold within a second predetermined time period.

In some embodiments, the method further comprises delaying voltage output from the DC power generator until at least one of: a predetermined time elapses after the secondary engine is started; and the engine speed corresponds to the engine speed setting.

In some embodiments, the auxiliary power system and the primary engine are in a vehicle.

Other aspects and features of the present disclosure will become apparent, to those ordinarily skilled in the art, upon review of the following description of the specific embodiments.

BRIEF DESCRIPTION OF THE DRAWINGS

Aspects and embodiments of the disclosure will now be described in greater detail with reference to the accompanying diagrams, in which.

DETAILED DESCRIPTION

Figure 1:
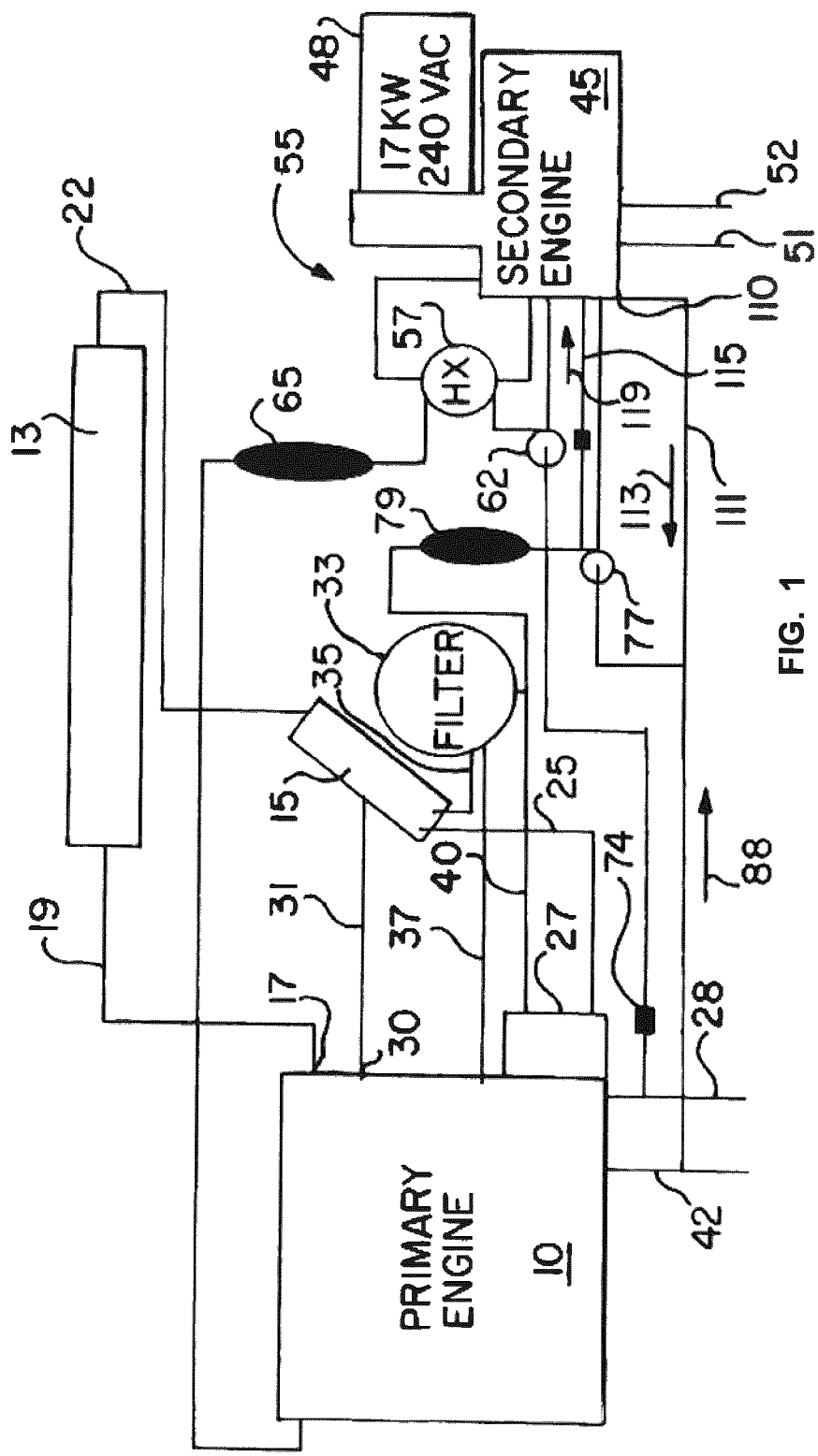
FIG. 1 is a schematic diagram of an example conventional APU system operating with a primary engine.

Some embodiments of the disclosure may provide an improved system for providing heating, or cooling, and electricity to a railroad locomotive in all operating environments. Some embodiments of the disclosure may save locomotive fuel and lubricating oil.

Without an APU, when the primary engine is shut off, these cabin heating or air conditioning loads might deplete the locomotive battery system to the point where the locomotive primary engine cannot be re-started. This would be a near catastrophic incident as the locomotive runs on tracks. Service trucks with DC generators for charging might not reach the location where the disabled locomotive stopped, and tow-locomotives may not be obtainable and the track could be blocked. Typical conventional locomotive primary engines use water or a water-based liquid as coolant and may not have anti-freeze in their coolant. Thus, they normally have to run 24 hours per day, seven days per week in the winter months to prevent the water from freezing. In the event that the locomotive primary engine will not start due to its battery being depleted, its coolant could freeze or be dumped via a dump valve. Furthermore, if lubricant in an engine becomes too cold, the engine's starter may not be able to function (e.g. crank) properly.

Some aspects of the present disclosure provide a system and method that may furnish cold weather layover protection automatically in a mobile package that may protect primary engine systems and cab components against freezing. Some aspects of the present disclosure may allow for automatic shutdown of a primary engine instead of extended idling operation while maintaining a charge on the primary engine's battery. Some aspects of the present disclosure may allow for the operation of cab air conditioning while the primary engine is shut down. Some aspects of the present disclosure may provide electrical power in standard voltages suitable for use in a vehicle such as a locomotive. The auxiliary power system of the present disclosure includes a DC power generator. Many standard locomotives include electrical systems that use 74 VDC. The DC power generator may provide 74 VDC output to directly power the locomotive systems and/or charge the locomotives batteries when the primary engine is shut down. This may avoid the need to install hardware to convert AC power (e.g. from a conventional auxiliary power system) to DC for use in the locomotive. Such hardware may be expensive and require additional room to install in a locomotive. Thus, the auxiliary power system described herein may reduce complexity, cost and installation space required. A DC power generator may also allow variable engine speed (and thus variable power output) with the same voltage output.

Some aspects of the disclosure may enable an improved system for providing heating or cooling and electricity to a railroad locomotive in various operating environments, and may save locomotive fuel and lubricating oil. An auxiliary power unit (APU) may be referred to as an auxiliary power system herein. An APU may include a diesel engine coupled to an electrical generator installed in a locomotive cab. The diesel engine of the APU may be referred to as a "secondary" engine herein due to its role of supporting a primary engine. The secondary engine may be a turbo charged, four-cylinder diesel engine, such as one manufactured by Kubota, and rated at about 32 brake horsepower, at 1800 RPM. The auxiliary unit engine may draw fuel directly from the main locomotive fuel tank. Equipping the APU with a 20-gallon lube-oil sump and recirculating pump to permit extended oil change intervals can minimize maintenance of such auxiliary unit engine. For protection of the secondary engine, it should also be equipped with over-temperature and low lube-oil pressure shutdowns to prevent engine damage in the event that the engine overheats or runs low on lube-oil.

An example conventional APU system is described below with reference to FIGS. 1 to 9. It is to be understood that the example system described below is provided by way of example, and embodiments of the disclosure are not limited to specific details of the example locomotive or APU arrangements described below with reference to FIGS. 1 to 9.

FIG. 1 is a schematic diagram of an example APU system operating with a primary engine 10. The primary engine 10 has an integral cooling system including radiator 13 for dissipating heat absorbed from primary engine 10 and support components such as lube-oil cooler 15. The flow path of coolant for the primary engine 10 forms a closed loop. Coolant exits primary engine 10 at junction 17 through exit conduit 19 and flows to radiator 13 wherein heat is transferred from such coolant to the atmosphere. Such coolant flows through transfer conduit 22 to oil cooler 15 wherein heat is transferred from lubricating oil for primary engine 10 to such coolant. Such coolant flows through return conduit 25 to reenter primary engine 10 at strainer housing 27. Engine coolant drain line 28 is provided to enable removal of coolant during cold weather to prevent freeze damage.

Primary engine lube-oil provides lubrication for primary engine 10 and helps remove heat of combustion from primary engine 10. Such lube-oil exits primary engine 10 at junction 30 through exit pipe 31 to oil cooler 15 where it transfers heat to the primary coolant. Lube-oil exits oil cooler 15, travels to oil filter 33 through connector pipe 35 and returns to primary engine 10 through return pipe 37. Filter drain line 40 connects to strainer housing 27 and is provided to enable draining of oil from the system during periodic maintenance. During periodic oil changes, lube-oil is drained from the entire system through lube-oil drain 42.

The APU system includes a secondary engine 45 having an Alternating Current (AC) electrical generator 48 mechanically coupled to such secondary engine 45. Secondary engine 45 may be a turbo charged, four-cylinder diesel engine, such as one manufactured by Kubota, and rated at 32 bhp at 1800 RPM. Such engine can draw fuel directly from the primary engine fuel tank. Secondary engine 45 draws fuel for operation from a common fuel supply for the primary engine 10 through fuel connections 51, 52. Secondary engine 45 presents a separate closed loop auxiliary coolant system 55 including heat exchanger 57, which is designed to transfer heat generated by operation of secondary engine 45 to a system designed to maintain primary engine 10 warm. Auxiliary coolant in such separate closed loop system 55 flows through secondary engine 45 and absorbs waste heat generated by internal combustion within secondary engine 45. Such auxiliary coolant flows to heat exchanger 57 where it transfers such absorbed heat to primary engine coolant in a separate loop.

Figure 2:
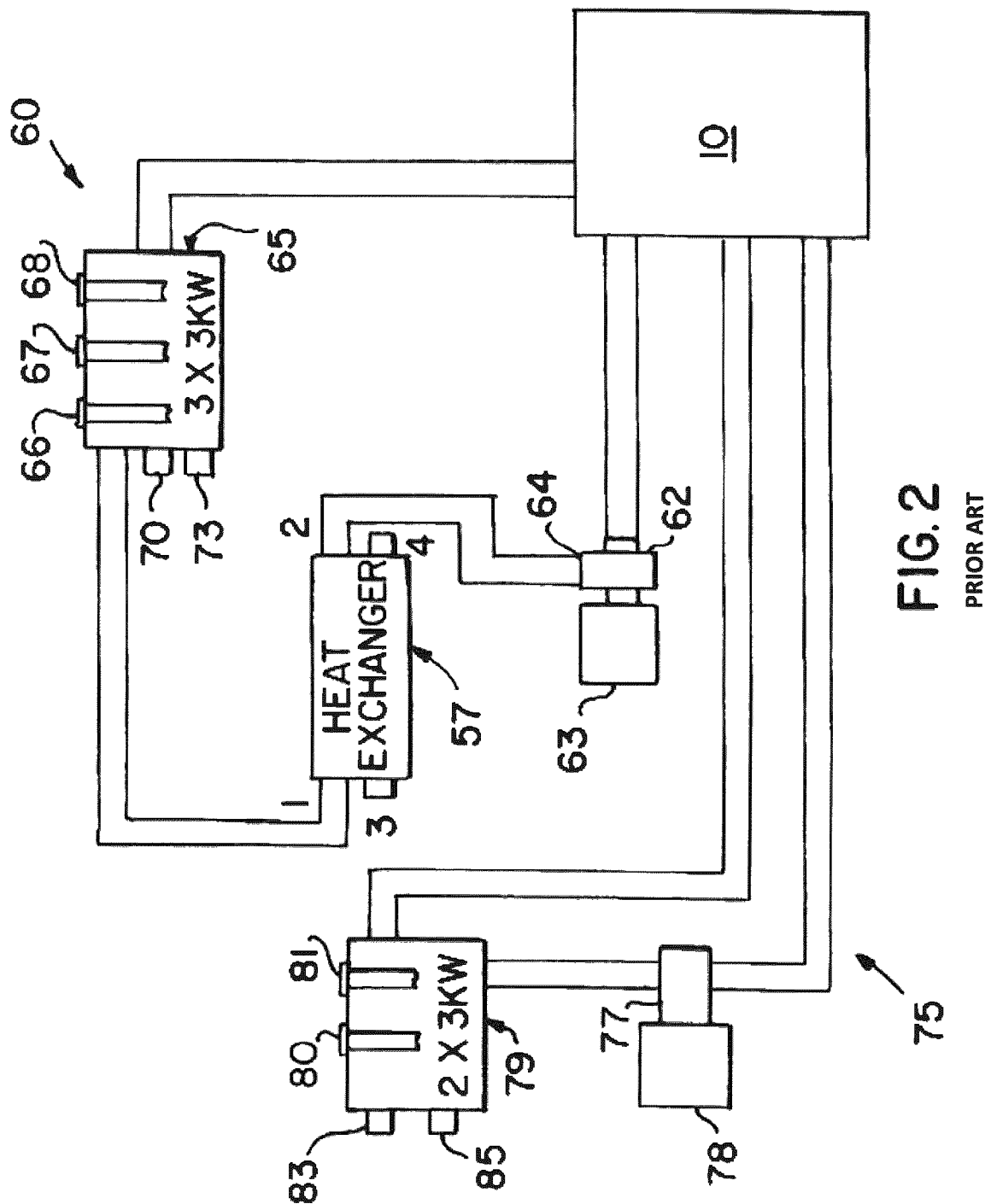
FIG. 2 shows an example primary engine coolant heating system and a primary engine lubricant heating system of the APU system of FIG. 1.

FIG. 2 shows a primary engine coolant heating system 60 and a primary engine lubricant heating system 75 of the APU system of FIG. 1. The primary engine coolant heating system 60 is essentially an additional flow loop for primary engine coolant. The primary engine lubricant heating system 75 is essentially an additional flow loop for primary engine lubricant. The primary engine coolant heating system 60 and a primary engine lubricant heating system 75 are provided to maintain primary engine 10 warm in cold environmental conditions. The primary engine coolant heating system 60 includes pump 62 used for conditioning of coolant. The primary engine coolant lubricant system 75 includes pump 77 used for conditioning of lube-oil. Coolant pump 62 can be electrically driven, or, in an alternate embodiment, can be driven directly by secondary engine 45. The inlet of pump 62 is operatively connected by a conduit to a suitable location in the coolant system of primary engine 10.

Pump 62 is powered by an electric motor 63. Its outlet at 64 is connected to a conduit leading to the inlet of heat exchanger 57. Coolant is discharged from pump 62 to heat exchanger 57. The heat exchanger 57 forms part of both the primary engine coolant heating system 60 and the primary engine lubricant heating system 75. (For clarity, the connections on heat exchanger 57 have been numbered in FIGS. 2 and 3.) Coolant enters heat exchanger 57 at 2 and exits at 1, to coolant heater 65. A conduit connects the outlet of heat exchanger 57 to coolant heater 65.

The primary engine coolant heating system 60 further includes coolant heater 65 that augments heat exchanger 57 to add heat to primary engine coolant. The coolant heater 65 may include three electrical water heater elements 66, 67, 68 of about 3 kw each. Alternate embodiments may include more or less heater elements and heater elements of different sizes. Coolant heater 65 includes coolant thermostat 70 for determining coolant temperature and thermometer 73 for displaying primary engine temperature. Coolant thermostat 70 is employed in a coolant temperature control circuit as described later herein. Coolant from primary engine 10 may be drawn from a connection in engine coolant drain line 28 (FIG. 1) by the suction of pump 62. Other coolant suction locations can be selected as desired. Coolant then travels to heat exchanger 57 and coolant heater 65 and returns to primary engine 10 via a return conduit. Such conduit may include a suitable check valve and isolation valve (not shown). Such a check valve may permit passage of coolant to pump 62, but does not permit entry of liquid into coolant heating system 60 upstream of coolant heater 65 when primary engine 10 is operating. A primary engine water drain valve 74 (FIG. 1) opens and drains primary engine 10 of coolant in order to protect primary engine 10 from freeze damage in the event that secondary engine 45 fails to start and no operator action is taken. Control of primary engine coolant temperature by components of coolant heating system 60 is described in more detail later herein with reference to FIGS. 7 and 8.

The primary engine lubricant is lube-oil in this embodiment. Primary engine lubricant heating system 75 includes oil pump 77 which can be electrically driven, or, in an alternate embodiment, can be driven directly by secondary engine 45. Optionally, oil pump 77 may be a positive displacement pump and a motor 78 powers the oil pump 77. Primary engine lubricant heating system 75 also includes oil heater 79 adds heat to primary engine lube-oil. Optionally, oil heater 79 includes two electrical oil heater elements 80, 81 of about 3 kw each. Alternate embodiments can include more or less heater elements and heater elements of different sizes. Oil heater 79 includes oil thermostat 83 for determining lube-oil temperature and thermometer 85 for displaying primary engine lube-oil temperature. Oil thermostat 83 is employed in an oil temperature control circuit as described later herein. Optionally, oil from primary engine 10 is drawn from a connection in lube-oil drain line 42 (FIG. 1) by the suction of oil pump 77 in the direction of arrow 88 (FIG. 1). Other oil suction locations can be selected as desired. Lube-oil is discharged from pump 77 to oil heater 79 and returns to primary engine 10 via a connection in filter drain line 40 (FIG. 1). Other oil return locations can be selected as desired. Control of primary engine lube-oil temperature by components of lubricant heating system 75 is described in more detail later herein with reference to FIGS. 7 and 8.

Figure 3:
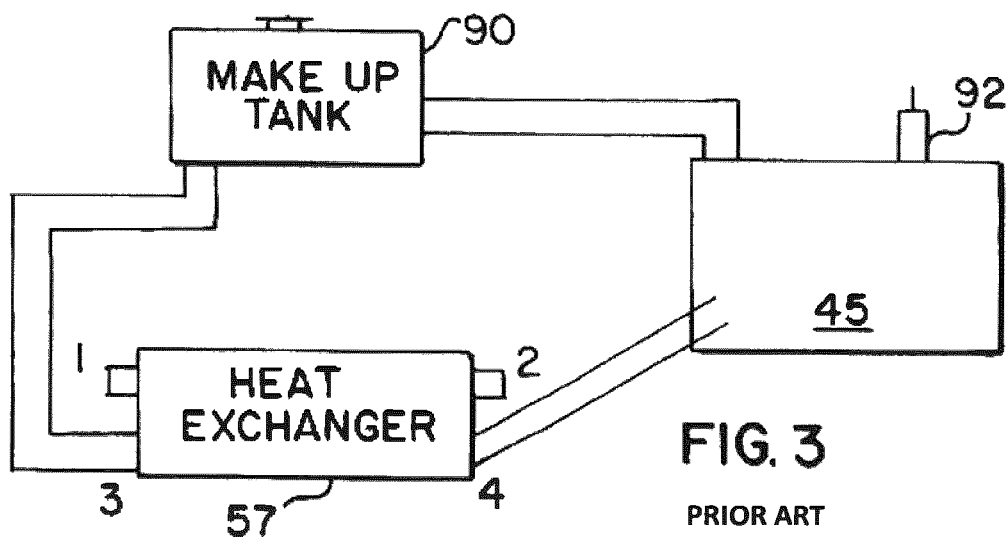
FIG. 3 illustrates an example conventional auxiliary coolant system for a secondary engine.

FIG. 3 illustrates an auxiliary coolant system for secondary engine 45. Coolant in such system absorbs waste heat of combustion from secondary engine 45 and transfers such heat in heat exchanger 57 to coolant in the coolant heating system 60 (FIG. 2). (For clarity, the connections on heat exchanger 57 have been numbered in FIGS. 2 and 3.) Auxiliary coolant enters heat exchanger 57 at 4 and exits at 3, and then travels to make up water tank 90 and returns to secondary engine 45. Make up water tank 90 is disposed in such auxiliary coolant system to ensure sufficient coolant is available to safely operate secondary engine 45. An engine temperature-sensing device 92 is included to display operating temperature of secondary engine 45.

Figure 4:
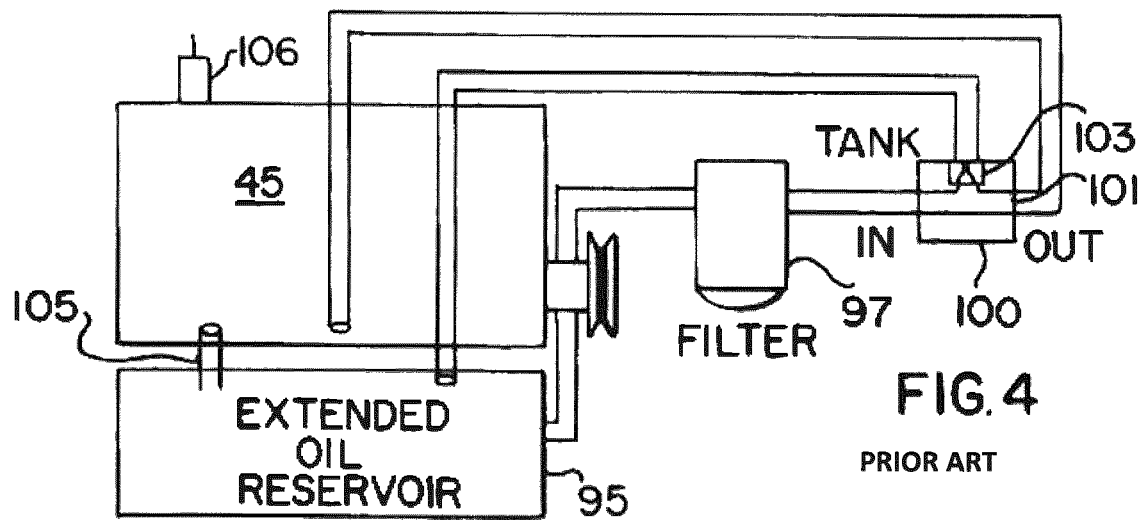
FIG. 4 is an example block diagram a conventional auxiliary engine lube-oil system.

FIG. 4 illustrates a lube-oil system for secondary engine 45. A large oil sump 95 or reservoir is provided to enable extended operation between oil changes in conjunction with periodic maintenance of primary engine 10. Oil is drawn from sump 95 through filter 97 to oil change block 100, which contains a metering nozzle 101 to control the amount of oil flow to secondary engine 45. Also contained in oil change block 100 is an integral relief valve 103 to protect secondary engine components from an overpressure condition. If relief valve 103 lifts, oil is directed back to sump 95. Such secondary engine lube-oil system is also provided with a crankcase overflow 105 to prevent damage to secondary engine components from excess oil in the engine crankcase. Engine oil pressure and oil temperature sensing devices 106 are included to display operating oil temperature and pressure of secondary engine 45. For protection of the secondary engine 45, it is also equipped with over temperature and low lube-oil pressure shutdowns to prevent engine damage in the event that the engine overheats or runs low on lube-oil.

In an alternate embodiment, the lube-oil system of secondary engine 45 can be cross-connected with primary engine lubricant heating system 75. Referring to FIG. 1, oil can be drawn from secondary engine 45 at junction 110 through pipe 111 in the direction identified by arrow 113, and then into oil pump 77. At least a portion of the discharge of oil pump 77 is directed back to secondary engine 45 through connecting pipe 115 as indicated by arrow 119. Equipping the secondary engine 45 with a large lube-oil sump, such as 20-gallon capacity and pump 77 can permit extended oil change intervals and minimize maintenance of secondary engine 45.

Figure 5:
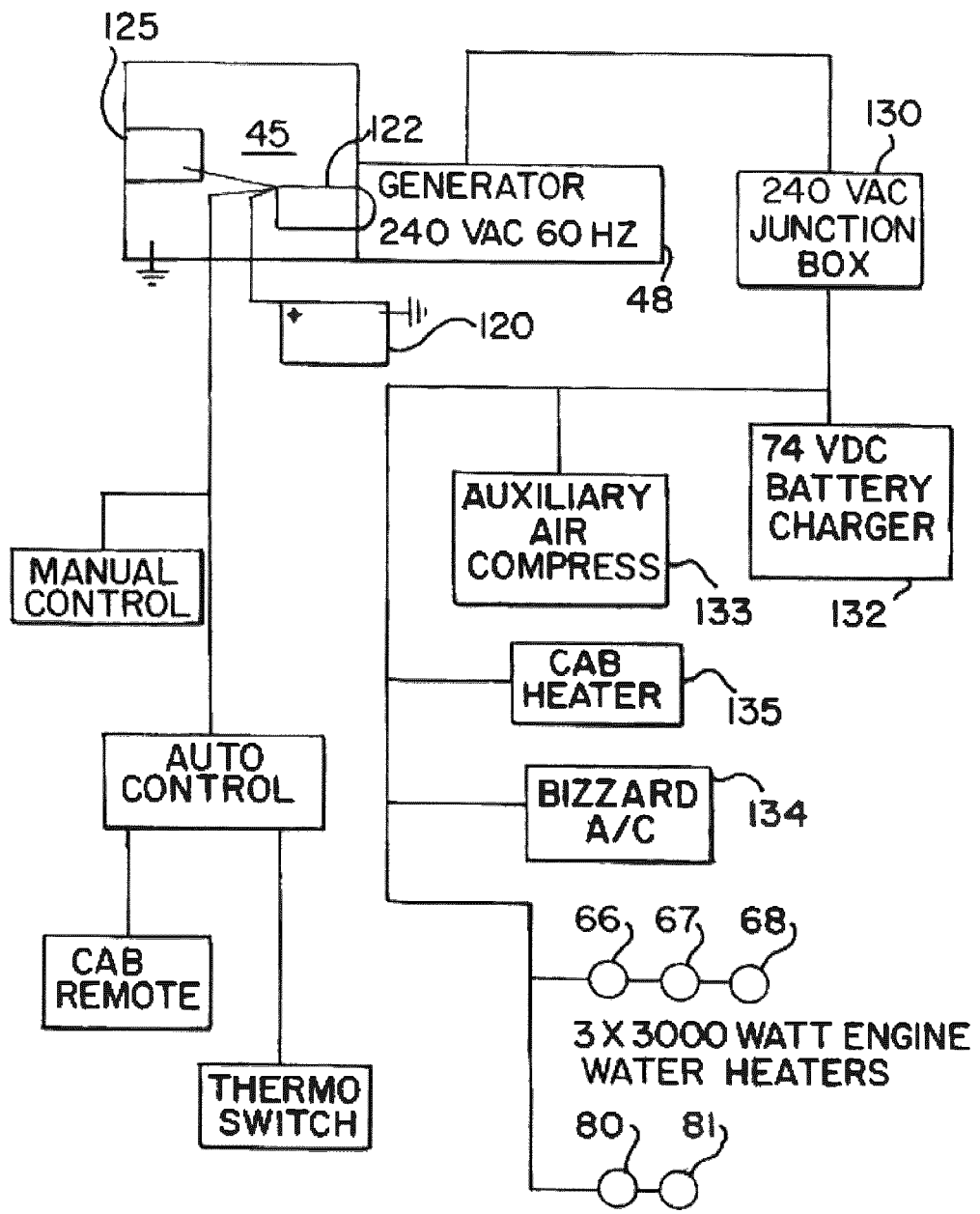
FIG. 5 is a block diagram of an example conventional electrical system of a locomotive.

FIG. 5 is a block diagram overview of an example locomotive electrical distribution system. Electrical power to start secondary engine 45 is provided by a separate battery 120 dedicated to such purpose, which may be a standard 12 VDC battery. Starter 122 turns over secondary engine 45 upon a start signal as described later herein in relation to FIG. 9. Alternator 125 maintains battery 120 in a ready condition during operation of secondary engine 45. Electrical generator 48 may be a 17 kva, 240 VAC/60 Hz single-phase generator, mechanically coupled to secondary engine 45. Other size and capacity generators may be used. The output of generator 48 is routed to output junction box 130 where electrical power is distributed to selected electrical loads such as, 240 VAC/74 VDC battery charger 132, such as a Lamarche A-40 locomotive battery charger for the locomotive batteries to maintain the primary engine battery charged whenever the secondary engine is operating. Other electrical loads may include auxiliary air compressor 133, air conditioner unit 134, and cab heater 135. Optionally, cab comfort may be maintained during cold weather periods by supplemental cab heaters 135 that respond to a wall-mounted thermostat. There may also be provided a 240 VAC cab air conditioner 134 to maintain cab comfort during warm weather periods. There can also be provided an electrical or mechanically driven air compressor 133 to maintain train line air pressure and volume.

Other 240 VAC electrical loads include electrical water heater elements 66, 67, 68, and electrical oil heater elements 80, 81. The electric water heater elements and the electric oil heater elements serve two purposes. One purpose is to provide immersion heat for the coolant heating system 60 and lubricant heating system 75. The second purpose is to load the secondary engine 45 through generator 48 and transfer the heat generated by this load through heat exchanger 57 into primary engine coolant in the primary engine coolant heating system 60.

Figure 6:
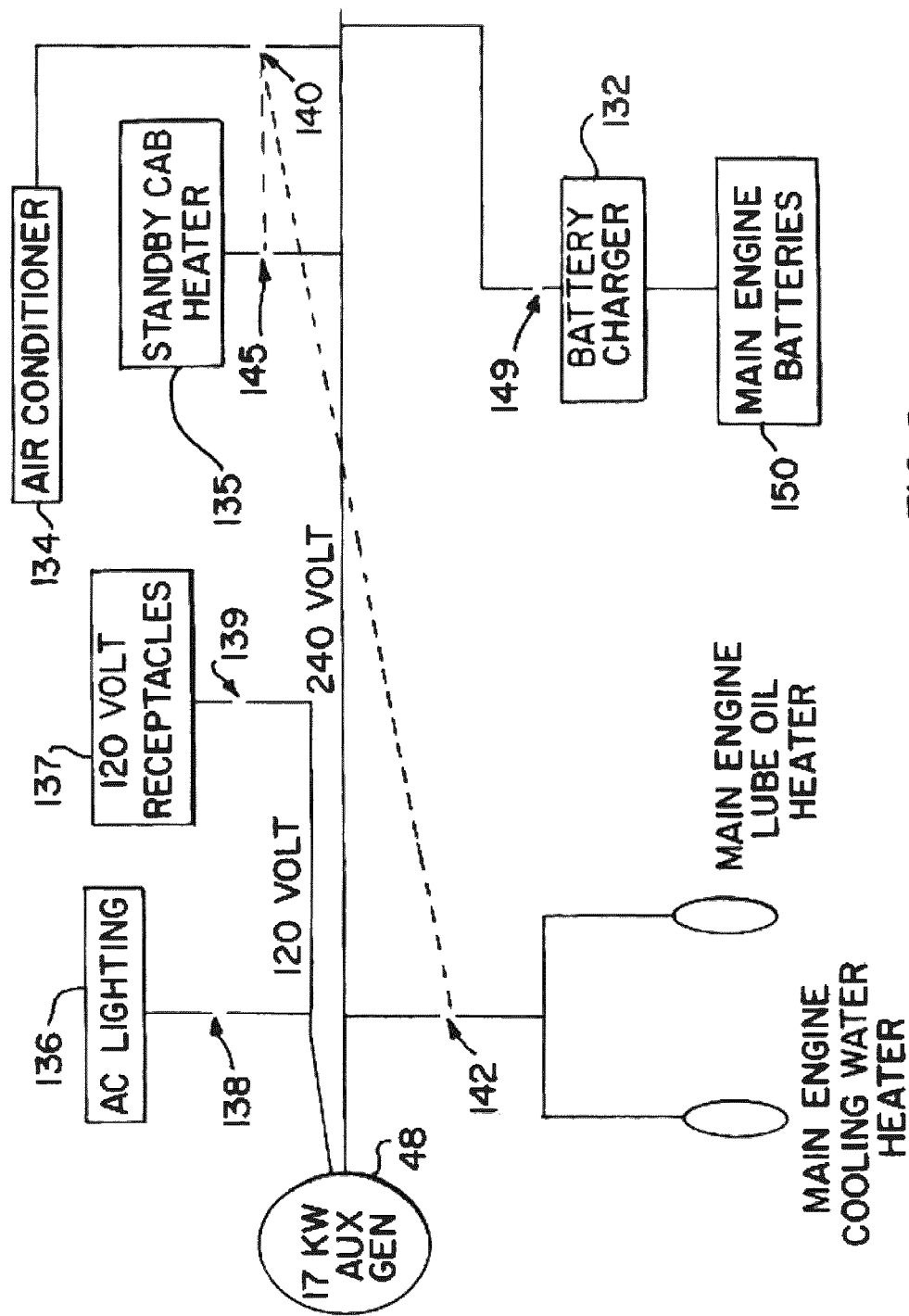
FIG. 6 is a block diagram of example conventional electrical components for describing example electrical control features.

Referring to FIG. 6, 240 VAC output from generator 48 can also be reduced to standard household 120 VAC for lighting 136 and receptacles 137, through circuit breakers 138 and 139 respectively. 240 VAC and 120 VAC outlets provide for non-vital electrical and hotel loads. For operational purposes, some 240 VAC breakers may be interlocked as illustrated in FIG. 6. For example, to prevent overload of generator 48 during warm weather operation, air conditioner circuit breaker 140 is interlocked with electric heater circuit breaker 142 such that both circuit breakers cannot be closed at the same time. In addition, there is no need to operate air conditioner 134 simultaneously with cab heaters 135, accordingly air conditioner circuit breaker 140 is interlocked with cab heater circuit breaker 145 such that both circuit breakers cannot be closed at the same time. Electric power for a 240 VAC/74 VDC battery charger 132 is provided through circuit breaker 149 to maintain the primary engine battery 150 charged whenever the secondary engine 45 is operating.

Figure 7:
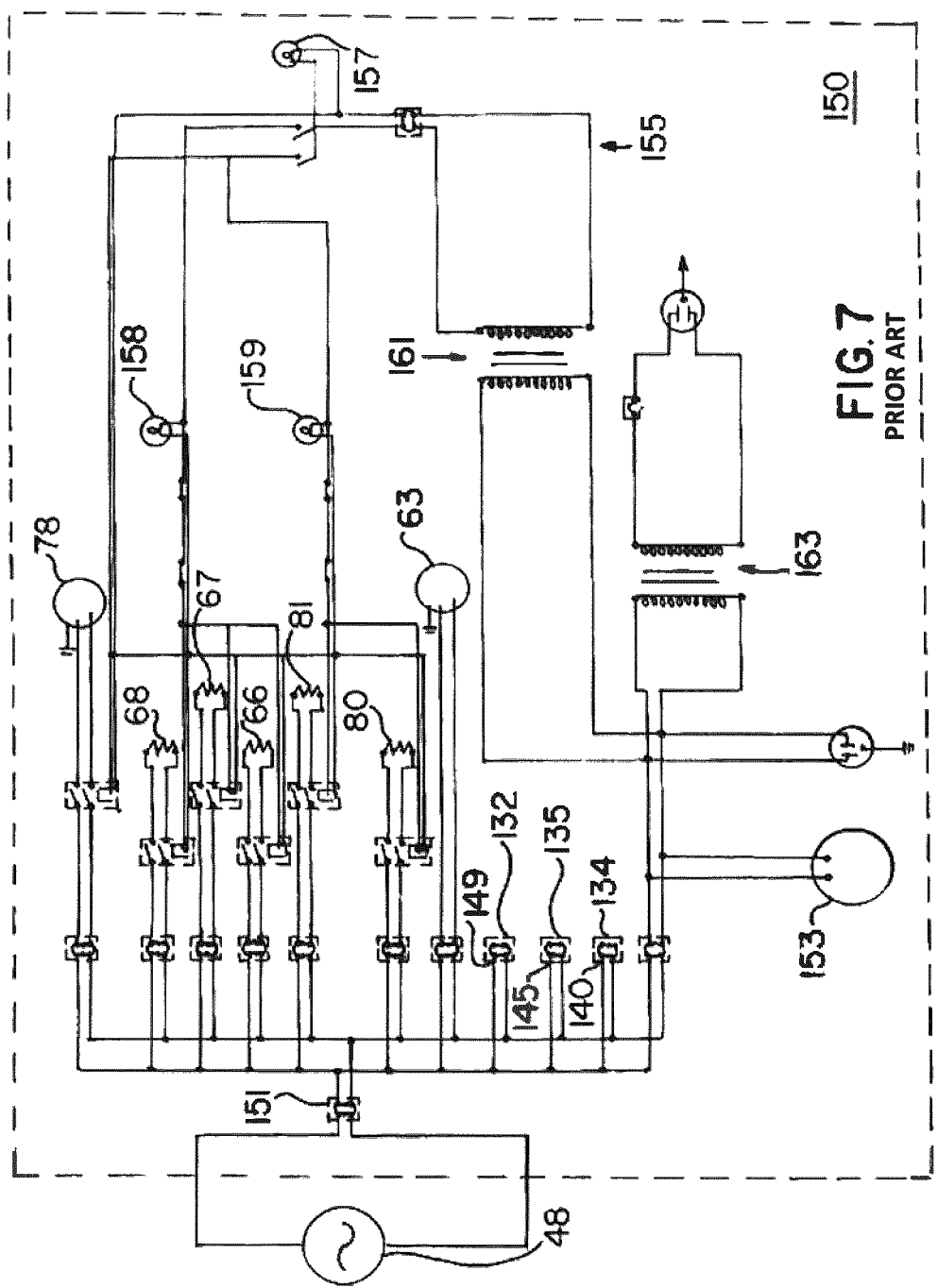
FIG. 7 is an electrical schematic diagram of an example conventional electrical control panel.

FIG. 7 is an electrical schematic diagram of electrical control panel 150. Control panel 150 contains circuit breakers and indicators for the electrical circuits. Main circuit breaker 151 is provided in panel 150 to break main power from generator 48. Circuit breakers are also provided for systems as described in relation to FIGS. 5 and 6, such as air conditioning 134, cab heater 135 and battery charger 132. Panel 150 also contains breakers for coolant water pump 80 and oil pump 77. Switches for oil heaters 80, 81 and for water heaters 66, 67, 68 are also provided in panel 150. Voltmeter 153, located in panel 150 is provided to monitor the output of generator 48. A 24 VAC secondary voltage circuit 155 is supplied to operate contactors and indicating lighting, such as power "on" indicator light 157, water heater "on" indicator light 158, and oil heater "on" indicator light 159. 240 VAC to 24 VAC step down transformer 161 is located in panel 150. 240 VAC to 120 VAC step down transformer 163 is also located in panel 150.

Figure 8:
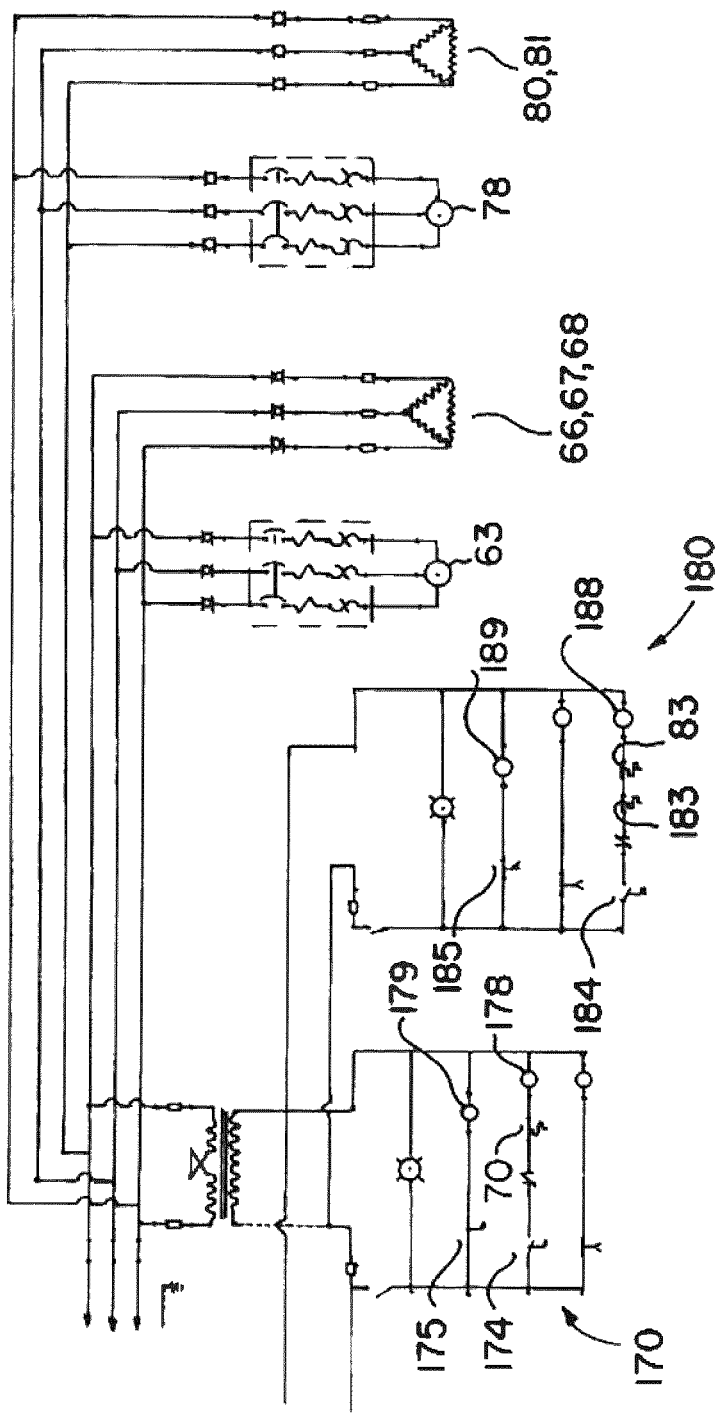
FIG. 8 is a wiring diagram of example conventional electrical control circuits for describing example operational features.

To maintain the primary engine 10 warm in low ambient temperature conditions, a control system, such as illustrated in FIG. 8 is provided. Locomotive coolant pump 62, heat exchanger 57, and coolant heater 65, including immersion heaters 66, 67, 68 maintain the primary engine cooling temperature above a preselected temperature, such as 75° F. A positive displacement lube-oil recirculating pump 77 and oil heater 79, including immersion heaters 80, 81 maintain locomotive lube-oil temperature above a preselected temperature, such as 50° F.

The various components of the apparatus can be electrically controlled to provide automatic monitoring of its operation and thermostatic control of the temperature of the liquids being circulated through coolant heating system 60 and lubricant heating system 75 to assure proper operation of the conditioning apparatus to maintain engine 10 in readiness for use. An electric control unit, such as shown in FIG. 8 is connected to the motors 63 and 78 for pumps 62, 77 respectively.

Coolant control circuit 170 controls operation of coolant pump 62 and coolant heater 65. The temperature of the coolant is monitored by thermostatic element 70, and flow responsive switches 174 and 175 monitor the flow rate of coolant. Should flow be interrupted, coolant control circuit 170 is capable of shutting down pump 62 to assure against damage to the coolant or equipment. Thermostatic element 70 further monitors the temperature of the coolant and properly operates heating elements 66, 67, 68 through heater element contact coil 178.

Under normal use, thermostatic element 70 is preset to a temperature at which the coolant is desired while circulating through engine 10, such as 75° F. Until the circulating coolant reaches this temperature, thermostatic element 70 will continue operation of heating elements 66, 67, 68 to add heat to coolant in the primary engine coolant heating system 60. The coolant is heated by direct contact along heating elements 66, 67, 68. When the coolant reaches the desired temperature, thermostatic element 70 will cause heating element contactor coil 178 to open the circuit to heating elements 66, 67, 68 until the liquid temperature again falls below such predetermined temperature level.

To insure against damage to the heating elements 66, 67, 68 due to lack of liquid recirculation, the flow control switches 174, 175 monitor the passage of coolant through coolant heater 65. So long as flow continues, switch 174 remains closed. It is opened by lack of flow through coolant heater 65. This activation is used to immediately open the circuit to the heating elements 66, 67, 68 to prevent damage to them and to prevent damage to the coolant within coolant heater 65. Coolant control circuit 170 also includes a time delay coil 179 capable of monitoring activation of flow control switch 175. If flow has ceased for a predetermined time, time delay coil 179 will then shut down the entire apparatus and require manual restarting of it. In this way, operation of the apparatus can be automatically monitored while assuring that there will be no damage to liquid being circulated, nor to the equipment or engine 10.

Lube-oil control circuit 170 controls operation of lube-oil pump 77 and lube-oil heater 79. The temperature of the lube-oil is monitored by thermostatic element 83 and flow responsive switches 184 and 185 monitor the flow rate of lube-oil. Should flow be interrupted, the lube-oil control circuit 180 is capable of shutting down pump 77 to assure against damage to the oil or equipment. Thermostatic element 83 further monitors the temperature of the lube-oil and properly operates heating elements 80, 81 through heater element contact coil 188. High limit thermostat 183 operates as a safety switch to remove power from heating elements 80, 81 in the event lube-oil temperature exceeds a predetermined temperature.

Under normal use, thermostatic element 83 is preset to a temperature at which the lube-oil is desired to maintain engine 10 warm, such as 50° F. Until the circulating lube-oil reaches this temperature, thermostatic element 83 continues operation of heating elements 80, 81 to add heat to lubricant in the primary engine lubricant heating system 75. The lube-oil is heated by direct contact along heating elements 80, 81. When the lube-oil reaches the desired temperature, thermostatic element 83 will cause heating element contactor coil 188 to open the circuit to heating elements 80, 81 until the liquid temperature again falls below such predetermined temperature level. If the lube-oil reaches an unsafe temperature, high limit thermostat 183 will cause heating element contactor coil 188 to open the circuit to heating elements 80, 81 until the liquid temperature again falls below a predetermined temperature level.

To insure against damage to the heating elements 80, 81 due to lack of liquid recirculation, the flow control switches 184, 185 monitor the passage of lube-oil through lube-oil heater 79. So long as flow continues, switch 184 remains closed. It is opened by lack of flow through lube-oil heater 79. This activation is used to immediately open the circuit to the heating elements 80, 81 to prevent damage to them and to prevent damage to the lube-oil within lube-oil heater 79. Lube-oil control circuit 180 also includes a time delay coil 189 capable of monitoring activation of flow control switch 185. If flow has ceased for a predetermined time, time delay coil 189 will then shut down the entire apparatus and require manual restarting of it. In this way, operation of the apparatus can be automatically monitored while assuring that there will be no damage to liquid being circulated, nor to the equipment or engine 10.

The purpose of the apparatus is to provide circulation of coolant and lubricant through the equipment or engine 10 while it is not operational. Pumps 62 and 77 are preset to direct liquid to the heating systems 60, 75 respectively at pressures similar to the normal operating pressures of the coolant and lubricant during use of the equipment or engine. Thus, the coolant and lubricant, or other liquids used in similar equipment, can be continuously circulated through the nonoperational equipment to effect heat transfer while the equipment (or engine) is not in use. In the case of a lubricant, surface lubrication is also effected, maintaining the movable elements of the equipment in readiness for startup and subsequent use. This pre-lubrication of the nonoperational equipment surfaces minimizes the normal wear encountered between movable surfaces that have remained stationary for substantial periods of time.

Control logic provides for a cooldown period for the automatic heaters before automatic shutdown of secondary engine 45 to cool and protect such energized electric heaters.

Figure 9:
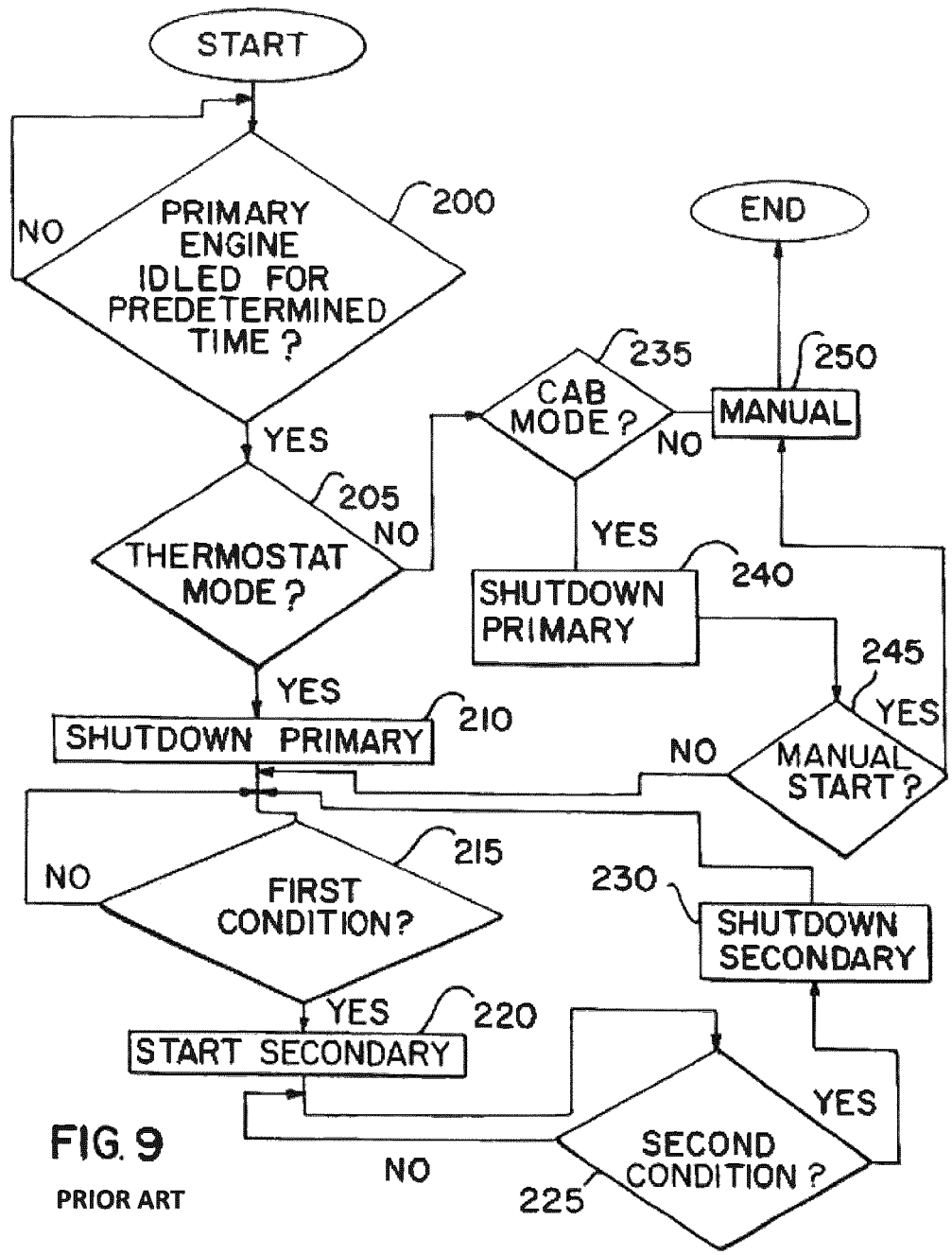
FIG. 9 is a flowchart of an example method for operation of a conventional APU system.

The system including primary engine 10 and APU system of FIG. 1 may be operated in a variety of modes. FIG. 9 is a flowchart of an example method of controlling the system described above. The secondary engine 45 may be selected for operation locally at an engine control panel or remotely in the locomotive cab. Control logic permits operation in any of the three modes "thermostat", "cab", and "manual" described below.

During normal operation of primary engine 10, the secondary engine 45 is not in operation. An engine idle timer at block 200 determines if primary engine 10 has been idled for a predetermined period of inactivity and idle operation, such as 30 minutes. After such period of inactivity, the next logical step is to determine the mode of operation of secondary engine 45.

If secondary engine 45 is selected to the "thermostat" mode, indicated at block 205, automatic control features shut down primary engine 10 as indicated at block 210. The "thermostat" mode is a preferred mode of operation for maintaining primary engine 10 warm during cold weather ambient conditions. In "thermostat" mode, the control system shuts down the primary engine 10 after a predetermined period of inactivity and idle operation, such as 30 minutes. In response to a first predetermined environmental condition 215, such as low locomotive coolant temperature or low lube-oil temperature, the secondary engine 45 will start 220 in order to warm primary engine systems as described later herein. When a second predetermined environmental condition 225, such as the selected temperature exceeds an established set point, secondary engine 45 automatically shuts down 230. Such environmental condition may be engine coolant temperature as measured by a primary engine block thermostat.

If secondary engine 45 is selected to the "cab" mode, indicated at block 235, automatic control features shut down primary engine 10 as indicated at block 240. The "cab" mode is a preferred mode of operation for warm weather operation to maximize fuel savings by limiting idling operation of primary engine 10. In "cab" mode, the control system automatically shuts down primary engine 10 after a predetermined period of inactivity and idle operation, such as 30 minutes. An operator can start secondary engine 45 manually as indicated at block 245. Secondary engine 45 remains operating upon operator command. If an operator does not start secondary engine 45, it will start automatically in response to a first predetermined environmental condition, such as low coolant temperature or low lube-oil temperature, and shut down when the selected temperature exceeds an established set point as described for "thermostat" control above. Alternatively, an override may be provided to permit extended idling operations at the discretion of the operator.

The "manual" mode, indicated at block 250 allows secondary engine 45 to be started by means of manually priming secondary engine 45. This provision allows for operation of secondary engine 45 in the event that automatic start up features malfunction, or to prime secondary engine 45, in the event it runs out of fuel.

In all modes of operation, secondary engine 45 may charge the primary batteries 150 and provides power to thermostatically controlled cab heaters 140 and 120 VAC lighting 136 and receptacles 137. In operation, when primary engine 10 is shut down automatically a blocking diode isolates the primary batteries 150 from 74 VDC loads to prevent discharge of the locomotive battery 150 during the shutdown period.

External audible and visual alarms can sound and light if secondary engine 45 fails to start during a thermostatically initiated start in cold weather.

Optionally, 120 VAC internal and external lighting can be controlled by means of photo sensors and motion detectors for security of the locomotive.

As described above, large engine vehicles, such as a locomotive, may include various electrical systems and battery systems that run on DC electrical power. An APU with an AC electrical power output may, then, require additional hardware to be installed to convert the AC power output to DC power suitable to run the electrical systems and/or charge battery systems. Furthermore, AC generators may need to run at fixed speeds in order to interface with a locomotive's DC grid and batteries (which typically run on DC voltage, such as 74 VDC).

Figure 10:
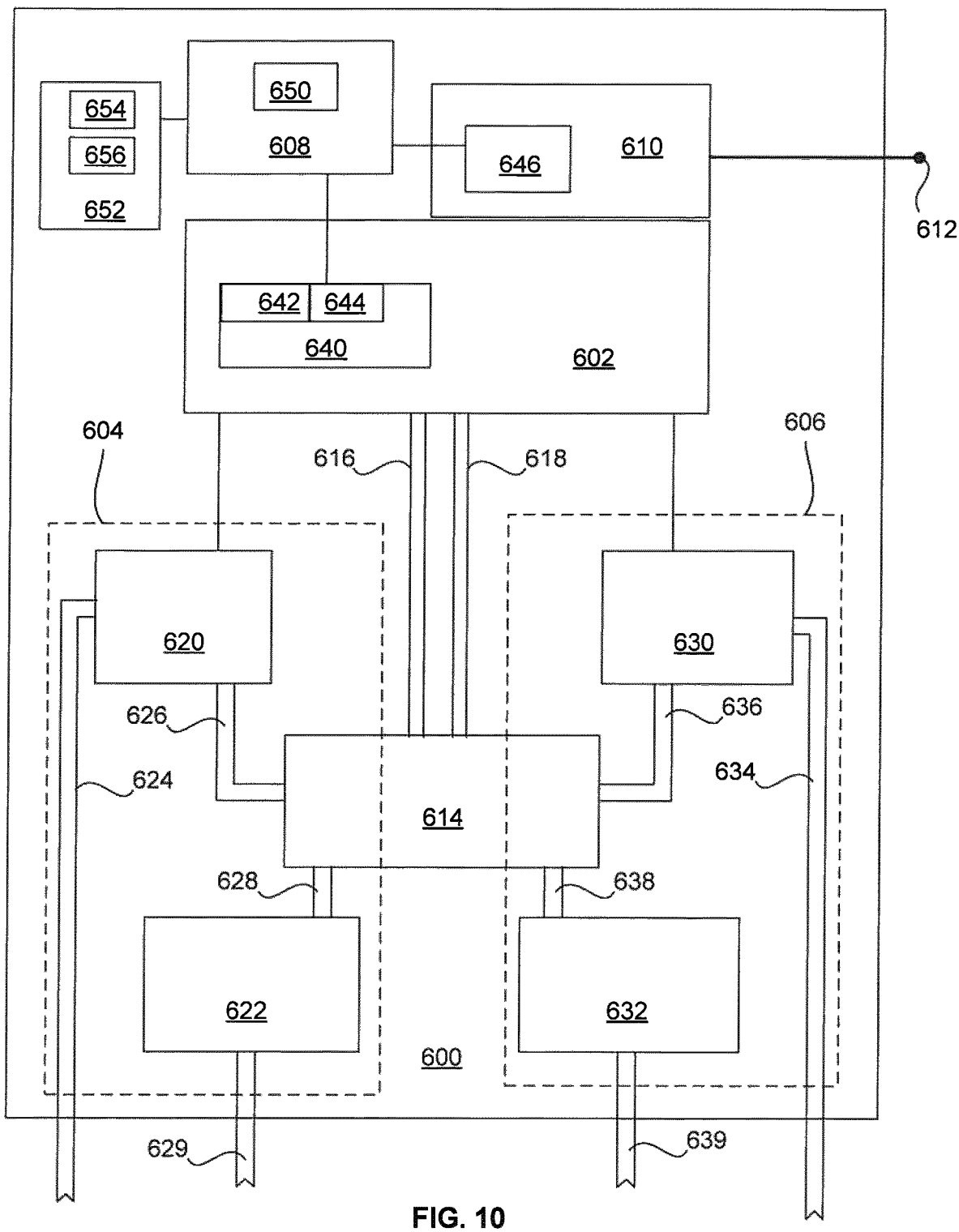
FIG. 10 is a functional block diagram of an example APU system according to some embodiments.

FIG. 10 is a functional block diagram of an APU 600 according to some embodiments of the disclosure. It is to be understood that the various electrical and control elements of the conventional APU described with reference to FIGS. 1 to 9 may be omitted from the APU 600 in FIG. 10. For example, the APU 600 may omit delay coils, immersion heaters, and other components described above. The conventional APU described with reference to FIGS. 1 to 9 is provided simply by way of example. The APU 600 and other embodiments of the disclosure are not limited to any particular component or arrangement shown in FIGS. 1 to 9.

The APU 600 in FIG. 10 may operate in cooperation with a primary engine, such as the primary engine 10 in FIG. 1. The APU 600 includes a secondary engine 602 (e.g. combustion engine), a primary engine coolant heating system 604, and a primary engine lubricant heating system 606. The secondary engine 602 may, for example, be a three-cylinder diesel engine, such as one manufactured by Perkins and rated at about 21 kW at 3400 RPM, or alternatively a turbo charged, four-cylinder diesel engine, such as one manufactured by Kubota, and rated at 32 bhp at 1800 RPM. The APU may further include an oil sump (not shown), such as a 6 gallon or 20-gallon sump. Equipping the APU with a lube-oil sump and recirculating pump to permit extended oil change intervals can minimize maintenance of such auxiliary unit engine.

The primary engine coolant heating system 604 and the primary engine lubricant heating system 606 are each driven by the secondary engine 606. In other embodiments, only one of the primary engine coolant heating system 604 and the primary engine lubricant heating system 606 may be included (with the other omitted). The APU 600 further includes a control system 608 that automatically activates the secondary engine 602 responsive to a predetermined condition. For example, the predetermined condition may be sensing that the temperature of primary engine coolant or primary engine lubricant is below a respective threshold. The predetermined condition may be sensing that voltage from a battery bank or in a locomotive electrical system is below a threshold. The predetermined condition may thus be based on a temperature or battery power level, for example. The APU may not have knowledge of whether the primary engine is on or off. The APU 600 may also detect (via one or more sensors) that the primary engine has been shut down (either manually or automatically by an Engine Shutdown Timer, for example). Thus, the APU 600 may include one or more temperature and/or voltage sensors and the control system 608 may monitor the state of the locomotive (or other vehicle) and determine when the secondary engine 602 should be activated. In other embodiments, the APU may also be configured to automatically shut down the primary engine responsive to a predetermined condition (e.g. a predetermined time of the primary engine idling).

The secondary engine 602 may be activated even when the primary engine (not shown in FIG. 10) is still running. For example, temperatures may be too low, or there may be a problem in the locomotives electrical systems. The APU 600 may then run the secondary engine 602 for a time, such as two hours for example. The control system 608 may include or be coupled to an event recorder and/or a communication system (not shown). The control system may record and/o provide information on the cause of the activation of the secondary engine 602. For example, the control system may record and/or indicate whether the start of the secondary engine 602 was due to a measured voltage in the locomotive 74V system or the APU's 12V system. The 12 V system being low may indicate that a 12 V battery bank may be faulty or depleted. In the case that a 74V system is low, the 74 V auxiliary generator on the primary engine may be faulty.

The control system 608 may be coupled to the primary engine or receive input from one or more sensors to determine when to shut down the primary engine and/or activate the secondary engine 602. For example, the automatic shutdown of the primary engine and activation of the secondary engine may be based on methods similar to that described above (e.g. with respect to FIG. 9). The control system 608 may be coupled to a shutdown control (not shown) of the primary engine or otherwise coupled to the primary engine to enable shut down. Typically, however, the primary engine will be manually shutdown or automatically shut down by an Engine Shutdown Timer that may be external to the APU 600. The control system 608 may include or be part of an electronic controller including an interface for providing user input and one or more processors (e.g. Central Processing Unit (CPU)) to implement the controller functionality. For example, the control system 608 may comprise one or more processors and one or more computer-readable memory having instructions stored thereon that, when executed, cause the one or more processors to implement the functions described above or below. Any suitable hardware to implement the control system 608 may be used. The control system 608 may interface with the vehicle and may be mounted to the secondary engine or remotely (e.g. within a locomotive cab).

The APU 600 further includes a Direct Current (DC) power generator 610 that generates an output voltage at output 612. The DC power generator 610 is driven by the secondary engine 602. For example, the DC power generator 610 and secondary engine 602 may each include a respective pulley (not shown) coupled by a belt. Any suitable method to drive a generator by an engine may be used. The DC power generator 610 may, for example, be a 74 VDC, 150 A generator, driven via a belt connection to the secondary engine 602. The output of the DC power generator 610 may be sent to selected electrical loads such as, coolant and/or lubricant heaters and the locomotive's 74VDC battery bank which at times will need to be charged.

The APU in this example includes optional heat exchanger 614 that receives heated coolant from the secondary engine 602 via fluid line 616 and returns cooled coolant to the secondary engine 602 via fluid line 618 (similar to the arrangement shown in FIG. 3). Any suitable heat exchanger system for removing the excess or waste heat from coolant may be used. The heat exchanger 614 in this example is configured to transfer heat from the secondary engine (via secondary engine coolant) to the primary engine coolant and primary engine lubricant (oil) as explained below.

The primary engine coolant heating system 604 in this example is similar to the primary engine coolant heating system 60 shown in FIG. 2. Namely, the primary engine coolant heating system 604 of FIG. 10 includes a coolant pump 620, the heat exchanger 614 and a coolant heater 622. The coolant pump 620 is driven by secondary engine 602 and pumps primary engine coolant from a primary engine (not shown in FIG. 10) via coolant line 624. The coolant pump 620 delivers the primary engine coolant to the heat exchanger 614 (via coolant line 626) where it absorbs heat dissipated from the secondary engine coolant. The primary engine coolant, thus heated, exits the heat exchanger 614 and travels to coolant heater 622 via coolant line 628. The coolant heater 622 optionally further heats the primary engine coolant, and the primary engine coolant is returned to the primary engine via coolant line 629. The coolant heater 622 may be controlled by the control system 608. For example, one or more temperature sensors may sense the temperature of the primary engine coolant in the primary engine coolant heating system 604, and the coolant heater 622 may be activated if the temperature is below a threshold. The coolant heater 622 may include three electrical water heater elements similar to the coolant heater 65 in FIG. 2. The electrical water heater elements may be 2 kW or 3 kW each. It is to be understood that the primary engine coolant heating system 604 is provided by way of example only, and embodiments may omit the primary engine coolant heating system 604 or use an alternate design. As one example, one or both of the heat exchanger 614 and the coolant heater 622 may be omitted. Alternate means may also be used to heat the primary engine coolant. Any suitable system for heating primary engine coolant may be used.

The primary engine lubricant heating system 606 in this example may be similar to the primary engine lubricant heating system 75 shown in FIG. 2. The primary engine lubricant heating system 606 of FIG. 10 includes a lubricant pump 630, the heat exchanger 614 and a lubricant heater 632. The lubricant pump 630 is driven by secondary engine 602 and pumps primary engine lubricant (e.g. lube oil) from a primary engine (not shown in FIG. 10) via lubricant line 634. The lubricant pump 630 may include a pressure line (not shown) and a hydraulic valve (not shown) in the pressure line. The hydraulic power may be used for hydraulic motors or actuators before the lubrication oil goes back to a sump of the primary engine.

The lubricant pump 630 delivers the primary engine lubricant to the heat exchanger 614, via lubricant line 636, where it absorbs heat dissipated from the secondary engine coolant. The primary engine lubricant may, for example, circulate through a liquid-to-liquid portion of the heat exchanger 614. The other liquid in the liquid-to-liquid portion of the heat exchanger 614 may be a tank of heated coolant from the APU's secondary engine 602. The primary engine lubricant may also be heated by other sources including, but not limited to heated secondary engine lubricant or the locomotives heated water. The primary engine lubricant then exits the heat exchanger 614 and travels to lubricant heater 632 via lubricant line 628. The lubricant heater 632 optionally further heats the primary engine lubricant, which is returned to the primary engine via lubricant line 639. The lubricant heater 632 may be similar to oil heater 79 in FIG. 2 (including heating elements of 2 kW or 3 kW, for example). In some embodiments, the lubricant heater 632 may include a liquid to liquid heat exchanger.

The lubricant heater 632 may be coupled to and controlled by the control system 608. For example, temperature sensors may sense the temperature of the lubricant in the primary engine lubricant heating system 606, and the lubricant heater 632 may be activated if the temperature is below a threshold. It is to be understood that the primary engine lubricant heating system 606 is provided by way of example only, and embodiments may omit the primary engine lubricant heating system 606 or use an alternate design. As one example, one or both of the heat exchanger 614 and the lubricant heater 632 may be omitted. Alternate means may also be used to heat the primary engine lubricant. Any suitable system for heating primary engine lubricant may be used.

The coolant lines 624, 626, 628 and 629 and/or the lubricant lines 634, 636, 638 and 639 may be pipes, flexible tubes, or any other suitable means for conducting fluids (including coolant and lubricant) through a system. The APU 600 may not include such coolant lines 624, 626, 628 and 629 and/or the lubricant lines 634, 636, 638 and 639, which may instead be added upon installation of the APU 600. Additional components not shown in FIG. 10 (e.g. temperature sensors, additional pumps, valves, etc.) may be included. Embodiments are not limited to any particular components or materials for transporting fluids (coolant and lubricant) through the APU system described herein.

The coolant pump 620 and the lubricant pump 622 may be coupled to and powered by the secondary engine via any suitable means. For example, one or more pulleys and belts (e.g. serpentine belt) may couple the coolant pump 620 and the lubricant pump 622 to the secondary engine 602 (such that the secondary engine 602 drives the coolant pump 620 and lubricant pump 630). Other mechanical or electrical means (e.g. gears, axles, electric motors, etc.) may be used to couple the secondary engine 602 to the coolant pump 620 and lubricant pump 630. A belt system may allow the DC power generator 610 to be small and light weight and may allow it to be run at a relatively high RPM while the APU engine can be run at a moderate RPM. For example, the ratio of pulleys used in the belt system (e.g. serpentine belt system) may determine relative RPMs. The serpentine belt may also power the coolant pump 620 and/or lubricant pump 630 as mentioned above. The pulleys in the belt system may be sized to run the pumps 620 and 630 at a suitable flow rates. The belt system (e.g. serpentine belt system) may also be used for: an air compressor that could be used to keep the locomotive's air supply at an appropriate level; a second power generator that outputs a different voltage level such as 12V or 24 VDC or 120, 240, 208 or 480 VAC in order to power other systems; and/or a hydraulic pump. This belt system (e.g. serpentine belt system) may utilize an automatic belt tensioning system in order to minimize maintenance of the system.

The belt system may also have an optional back-up electric motor coupled to it via a pulley by which the electric motor, when powered and controlled can rotate and thus power all of the components attached to the serpentine system while the APU's secondary engine 602 is off. In such a scenario, a clutching mechanism (e.g. on the APU's crankshaft pulley) may be necessary on the APU engine's serpentine pulley in order to de-clutch the APU engine from the serpentine system and thus allow the electric motor to power the system. For example, a back-up electric motor may be powered by shore-power.

Turning again to FIG. 10, the coolant heater 622 and/or the lubricant heater 632 may be powered by the locomotive's electrical system (e.g. the common grid). In other embodiments, the coolant heater 622 and/or the lubricant heater 632 may be powered by the DC power generator 610. Alternatively, other power sources (e.g. batteries or alternate power generators) may power the coolant heater 622 and/or the lubricant heater 632.

The APU 600, utilizing the DC power generator 610, may not require the additional power conditioning/converting subsystems of a conventional APU since it can output the DC voltage that the locomotive system needs. This may reduce the parts required and thus installation and maintenance cost and time. Furthermore, in some embodiments an APU generating DC power (such as the APU 600 in FIG. 10) may be run at different speeds and still output the same desired DC voltage as discussed below. Thus, such a system may be set to different speeds for low and high power situations. Fuel consumption, noise levels and wear may thereby be reduced when desired via running the APU at a lower speed.

In the example of FIG. 10, the APU 600 includes optional engine speed control 640 that maintains an engine speed of the secondary engine 602 based on a speed setting. The set engine speed is adjustable within a range. In this embodiment, the engine speed control 640 comprises an engine speed sensor 642 that senses the current engine speed of the secondary engine 602. The engine speed control 640 also includes a fuel regulator 644 that increases fuel delivered to the secondary engine 602 if the current engine speed falls below the set engine speed by a first threshold and decreases the fuel delivered to the secondary engine 602 if the current engine speed exceeds the set engine speed by a second threshold. The thresholds may also be adjustable. The engine speed control 640 is connected to and controlled by the control system 608. For example, the control system 608 may receive input from the engine speed sensor 642 and provide output to the fuel regulator 644 accordingly. The engine speed control 640 may be an internal component of the control system 608 rather than external to the control system 608 (as shown in FIG. 10). Various arrangements may be used.

The APU 600 in this example also includes voltage regulator 646 that regulates the output voltage of the DC power generator. The output voltage may be maintained at 74 VDC, which may be suitable for powering the electrical systems of a typical locomotive and/or charging a battery bank in the locomotive. The voltage may be controlled by adjusting an excitation voltage within the generator 610. For example, the DC power generator 610 may include an excitation winding (not shown), and the voltage regulator 646 may adjust an excitation voltage in the excitation winding responsive to the output voltage. For example, if the output voltage is too low, then the excitation voltage may be increased. If the output voltage is too high, the excitation voltage may be decreased accordingly.

By use of the engine speed control 640 and/or the voltage regulator 646, the engine speed and/or output power of the APU 600 may be controlled. The engine speed and thus the generator speed may be manually adjusted to a suitable level depending on how much power the user requires. The lower the engine speed is set to, the lower its power output may be. However, at lower engine speeds, the APU may consume less fuel, produce less noise and have less wear within the engine and the system in general. For example, in the warmer months, the user may manually adjust the engine speed down to 2000 RPM and may have enough power for battery charging. In colder months, the user may manually increase the speed to 2800 RPM in colder months so that more power capacity is provided for battery charging and heating of coolant and/or lubricant.

The control system 608 may be configured to automatically adjust the engine speed (e.g. via a mechanical-electrical device connecting the control system 608 to the engine speed control 640). The control system 608 may adjust the speed as a function of ambient temperature and/or the current date for example. Such information and/or other factors may be used by the control system 608 to determine the most appropriate engine speed.

One notorious problem in conventional locomotives is battery condition. A locomotive may include a battery bank for starting the locomotive and powering its auxiliary equipment such as lights, heaters and air conditioning systems, etc. Thus, the condition of the battery bank may affect the function of the locomotive.

Batteries that are aged or poorly maintained may be challenging for an APU to charge. For example, some batteries may have internal shorts and some battery chemistries may have extremely high charge acceptance at the beginning of the charge cycle when the internal voltage is low. Such batteries may have a high in-rush current, in particular during the beginning of the charge cycle. This condition might overload the system and might burn out the APU's generator or cause the APU's engine to stall or its RPM to droop down to a speed too low to handle the generator's charging load. This in-rush current may not be protected by an ordinary inline fuse or similar mechanism because, if the inline fuse is triggered, it may stop the charge cycle entirely. In that case, the locomotive's batteries would get discharged to the point where the primary engine cannot be started.

In some embodiments, by using a power budget for the locomotive and factoring in the season and its expected conditions, the load for the DC power generator of the APU may be anticipated. The speed of the engine (base speed) may be adjusted and maintained. At this base speed, the performance and the load of the DC generator may be controlled by the voltage regulator (e.g. using excitation voltage adjustments) and the engine speed control maintains the base speed by compensating for the higher and lower loads.

In some embodiments, an APU (such as the APU 600 in FIG. 10) may include secondary engine anti-bog or anti-droop functionality that may remedy the overload condition described above and allow the charge to continue under moderate load and current until the battery bank is partly charged and the situation is normalized.

Turning again to FIG. 10, the control system 608 may receive feedback from the secondary engine 602 and/or the DC power generator 610 in order to determine if the engine RPM is drooping too far below its base speed, or if generator output voltage is too far below the desired level due to excessive loading. This determination may simply include comparing measured or sensed speed or output voltage to a minimum threshold speed and/or voltage. The minimum threshold(s) may be a predetermined amount below the currently set speed and output voltage. If the control system 608 determines that the engine speed or the generator voltage is too low, the control system 608 lowers a maximum allowed power output of the DC power generator 610 to reduce the load on the engine. The control system 608 may continuously monitor engine speed (RPM) and/or output voltage and keep lowering the maximum allowed power output of the DC power generator 610 until the engine speed and the output voltage are at acceptable levels. Once engine RPM and the generator voltage are sufficiently stable, the control system 608 may increase the maximum allowed power output of the generator in appropriate steps until approximately 100% power output is reached.

To control the power output, the control system 608 may command the change in maximum allowed generator output power to the voltage regulator 646 (e.g. via Controller Area Network (CAN) communications). Increasing and/or decreasing output power of the DC generator may be accomplished by altering the output voltage or current level from the DC power generator. For example, the voltage regulator 646 may lower the excitation field to limit maximum allowed output power from the DC power generator. Thus, power output may be monitored and adjusted without changing engine speed in some embodiments (e.g. where no automatic engine speed control is included in the APU 600). Voltage control may be provided by controlling an excitation voltage in the DC power generator 610 as described above. Even if automatic engine speed control is included in the APU 600, speed variations by altering fuel injection may be limited or not sufficient to respond to load changes, and the above control mechanisms may still be used to alter power output.

In some embodiments, if the generator is unable to produce sufficient power output at a given RPM to satisfy the current loads (e.g. after a predetermined time), then the control system may increase the engine speed (e.g. using an electromechanical device such as a solenoid attached to the engine's speed control to change the steady state speed to a new higher steady state speed). Increasing the engine speed may increase the output power capacity of the secondary engine and thus the output power capacity of the DC power generator. As mentioned above, some embodiments do not include automatic engine speed control. In such cases, the power output may be limited by adjusting the excitation field as described above. If altering the maximum allowed generator output and/or engine speed is still insufficient to overcome the "bog" or "droop" caused by loads on the APU 600, the control system 608 may shutdown the secondary engine 602 (e.g. by cutting fuel supply to the secondary engine). This situation may be referred to as "overload".

A locomotive with an APU may include an Engine Shutdown Timer (EST). An EST detects if the APU is enabled for low voltage and low coolant temperature protection of the primary engine, and, in such cases, the EST may automatically shut down the primary engine if it is left idling for more than a preset period of time, typically 15 to 30 minutes. The EST may be used to prevent long periods of idling of the primary engine when the operator is not on board. The EST may be external to the control system and/or the APU. The APU control system may automatically activate the secondary engine of the APU responsive to detecting that the primary engine has shut down. Alternatively, the EST may be included as part of the control system of the APU.

In some types of locomotives, in severe cold weather conditions, an APU's coolant heating system may not be powerful enough to prevent the primary engine's coolant from freezing. Thus, it may be desirable to prevent automatic shutdown of the primary engine in such conditions. To avoid an EST commanded primary engine shut down in extremely cold conditions, a thermo-switch may be used in some embodiments. The thermo-switch may be installed on the locomotives exterior to be exposed to the ambient temperature. The thermo-switch switch may include a temperature sensor and an electronic switch coupled to the temperature sensor that triggers at a preset low temperature and then re-sets once the temperature gets back above the preset low temperature. In some thermo-switches, the preset low temperature (which acts as a trigger point) cannot be reset without special tooling. When triggered, the thermo-switch may prevent automatic shutdown of the primary engine. For example, the thermo-switch may be wired into the EST's power line in such a way that the EST power is disabled while the switch is triggered and therefore the primary engine will continue to idle and keep warm as long as the temperature is below the set trigger level. Alternatively, the thermo-switch may provide input to the APU control system (e.g. including the EST), and the control system may be configured to not shut down the primary engine when the thermo-switch is triggered. The APU might still be enabled and running to assist in keeping the primary engine's coolant (e.g. water or water-based liquid) from freezing.

FIG. 10 shows optional EST 650 as part of control system 608, but the EST 650 may be separate from the control system 608 and the APU 600 in other embodiments. An optional thermo-switch 652 is also shown as part of the APU 600. However, the thermo-switch 652 may be omitted. Alternatively, the thermo-switch 650 may be separate from the APU 600. The thermo-switch 652 is coupled to the EST 650 via the control system 608 in this embodiment. The thermo-switch 652 includes a temperature sensor 654 and electronic switch 656 coupled to the temperature sensor 654. The temperature sensor 654 and electronic switch 656 function as described above to prevent primary engine shutdown when outdoor temperature is too low. The temperature sensor 654 may be separate from the electronic switch 656. For example, the temperature sensor 654 may be mounted to the exterior of the locomotive, while the switch is mounted within the locomotive. Alternatively, the temperature sensor 654 and electronic switch 656 may be housed together and mounted to the exterior. The thermo-switch 650 may be enclosed by a housing or otherwise designed in a manner to prevent tampering with or adjusted without special tools (e.g. tools not normally carried on board a locomotive).

Figure 11:
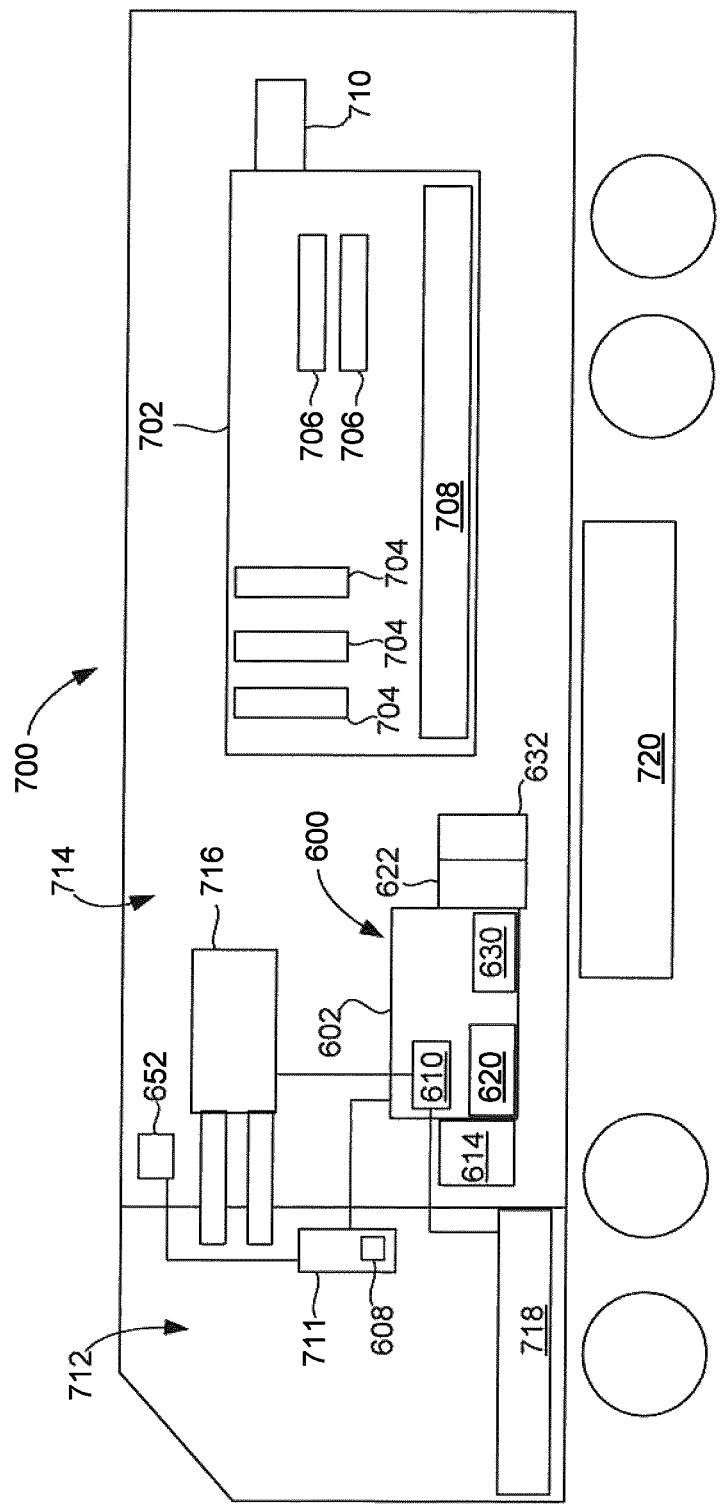
FIG. 11 is a schematic drawing of an example locomotive including the APU of FIG. 10 according to some embodiments.
Figure 12:
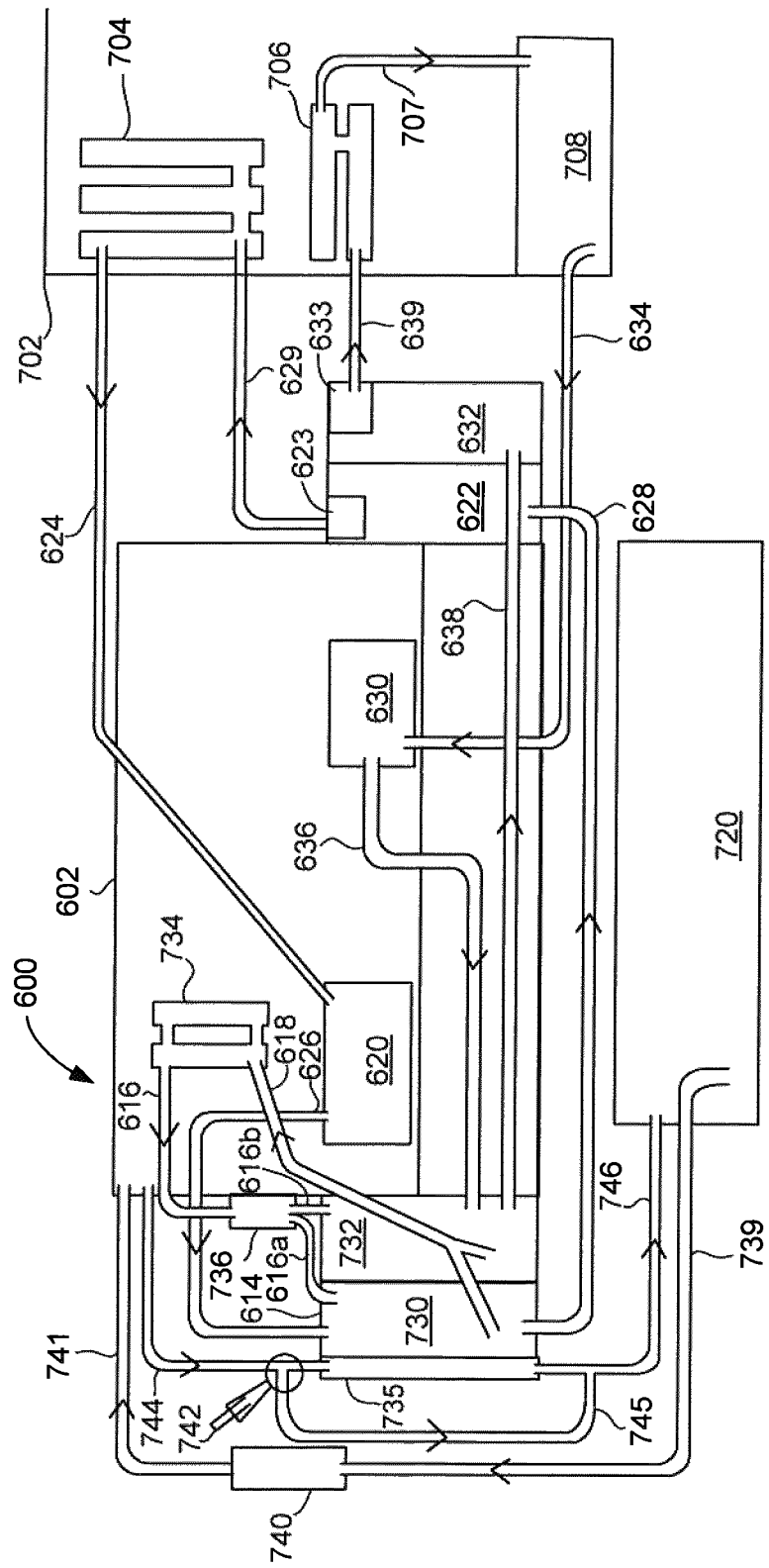
FIG. 12 is another schematic drawing of the APU in the locomotive of FIG. 11.

FIG. 11 is a schematic view of a locomotive 700 including the APU 600, according to some embodiments, showing an example arrangement of a primary engine 702 and the APU 600 from FIG. 10. The APU may be in the 20 to 50 hp range and equipped with an additional radiator (not shown) if necessary for summer use. In this example, the locomotive 700 is diesel electric. The primary engine may be a 1000 hp to 4000 hp locomotive engine, for example. The primary engine 702 and APU 600 may use water, or a water-based liquid such as antifreeze, as coolant and oil as lubricant in this embodiment. The coolant and lubricant connections and flow paths between the primary engine 702 and APU 600 are not shown in FIG. 11. However, example connections and flow paths between the primary engine 702 and APU 600 are shown in FIG. 12 and described below. It will be understood that flow paths for coolant and lubricant similar to those shown in FIGS. 1 to 3 may be implemented for the APU 600 and primary engine 702.

As shown in FIG. 11, the primary engine 702 includes coolant galleries 704 and oil galleries 706. The primary engine 702 also includes an oil sump 708 (e.g. 1000 to 3000 liter) and an auxiliary generator 710. The auxiliary generator 710 may output 74 VDC, for example.

FIG. 11 also shows the secondary engine 602, the DC power generator 610, the heat exchanger 614, the coolant pump 620, the lubricant pump 630, the coolant heater 622 and the lubricant heater 632 from FIG. 10. The DC power generator may provide 74 VDC and 100 to 150 AMP output, for example. In this embodiment, the control system 608 in FIG. 10 is housed within a control panel 711 that is mounted in a cabin 712 of the locomotive. The control panel 711 in this example accepts user input and provides that input to the control system 608. For example, a user may use the control panel 711 to set the engine speed, power output, or to adjust timer settings, etc. In some embodiments, the control panel 711 accepts user input to shut down the primary engine 702 and activate the secondary engine 602 of the APU, and vice versa. As shown, the APU 600 and the primary engine 702 are located within an engine room 714 of the locomotive (located rearward of the cabin 712).

The locomotive 700 also includes an air conditioning system 716 and battery bank 718. The battery bank 718 may operate at 65-74 VDC, for example. The air conditioning system 716 is a 74 VDC system in this example, and the battery bank 718 provides (and may be charged by) 74 VDC power. The air conditioning system may be powered by the primary engine's auxiliary generator 710, the battery bank 718, the APU 600, or a combination of the foregoing. The battery bank 718 may provide power for starting the primary engine 702 (e.g. via a starter motor) and/or the secondary engine 602. The battery bank 718 may also provide backup power for the electrical systems of the locomotive for a limited time. The auxiliary generator 710 may charge the battery bank 718 and power the electrical systems of the locomotive.

It will be understood that the placement and arrangement of the various components described above may vary from one locomotive or type of locomotive to another. One or more components may be omitted and/or added. Embodiments are also not limited to use in locomotives, and other vehicle types may be used.

When the APU 600 is running, the DC power generator 610 provides power for the air conditioning system 716 and charges the battery bank 718. The DC power provided by the APU 600 may also power other electrical systems not shown in FIG. 11, such as lights, audio systems, heating systems, etc.

FIG. 11 also shows fuel tank 720, which supplies fuel to the primary engine 702 and secondary engine 602. The fuel tank may be exposed to outdoor air (e.g. cold air). Thus, it may also be advantageous to heat fuel from the tank as described below.

The thermo-switch 652 is installed on the exterior of the locomotive 700 and coupled to the control system 608 of the APU through control panel 711. The control system 608.

Embodiments are not limited to the specific arrangement shown in FIG. 11. It is to be understood that variations to the example system described above are possible. For example, the thermo-switch 650, if included may be installed in various locations. Similarly, the APU 600 may be installed in various locations, and FIG. 11 is only provided as an example. The APU 600 is also not limited to use with a locomotive. Other vehicles having a primary engine may also use an APU similar to the APU 600 of FIG. 10.

FIG. 12 is a schematic drawing of the APU 600 in locomotive 700 that illustrates additional details of how primary engine coolant (e.g. water or water-based liquid possibly with additives, such as antifreeze) and primary engine lubricant (oil in this example) flows between the primary engine 702 and the example APU 600 of FIG. 11.

Coolant from the primary engine coolant galleries 704 is drawn by coolant pump 620 (via coolant lines 624 and 626) to a coolant heating portion 730 of the heat exchanger 614. In the coolant heating portion 730 of the heat exchanger 614, waste heat from the secondary engine 602 is transferred to the primary engine coolant. The primary engine coolant is transported from heat exchanger 614 to coolant heater 622 (via coolant line 628). An optional temperature sensor 623 coupled to the coolant heater 622 is shown, which measures the temperature of primary engine coolant passing through the coolant heater 622. The coolant heater 622 is configured to further heat the primary engine coolant when the temperature of the primary engine coolant is below a threshold. This way, the coolant heater 622 may only use power when needed (i.e. when the heat exchanger 614 has not sufficiently heated the primary engine coolant). The primary engine coolant then travels back to the primary engine coolant galleries 704 (via coolant line 629).

Oil from the primary engine oil sump 708 is drawn by oil pump 630 (via lubricant lines 634 and 636) to an oil heating portion 732 of the heat exchanger 614. In the oil heating portion 732 of the heat exchanger 614, waste heat from the secondary engine 602 is transferred to the primary engine oil. The primary engine oil is transported from heat exchanger 614 to oil heater 632 (via lubricant line 638). An optional temperature sensor 633 coupled to the lubricant heater 632 is shown, which measures the temperature of primary engine oil passing through the oil heater 632. The lubricant heater 632 is configured to further heat the primary engine oil when the temperature of the primary engine oil is below a threshold. This way, the lubricant heater 632 may only use power when needed (i.e. when the heat exchanger 614 has not sufficiently heated the primary engine oil). Warmed and pressurized primary engine oil then travels back to the primary engine oil galleries 706 (via lubricant line 639). After pre-lubricating bearings, the primary engine oil returns to oil sump 708.

The flow loop of secondary engine coolant (coolant in this example) is also shown in FIG. 12. Specifically, heated coolant from the secondary engine coolant galleries 734 is pumped (by a coolant pump 736) to the heat exchanger 614. Specifically, the coolant passes through coolant line 616 to the pump 736, and then via coolant lines 616a and 616b to the coolant and oil heating portions 730 and 732 of the heat exchanger 614 respectively. Waste heat from the secondary engine 602 is removed from the secondary engine coolant in the heat exchanger 614. Under full load, the waste heat output may be close to the electric output of the DC power generator 610 (shown in FIGS. 10 and 11). Finally, the secondary engine coolant returns (via coolant line 618) to the coolant galleries.

Fuel is drawn from the fuel tank 720 (via fuel line 739) and pumped by fuel pump 740 to the injectors (not shown) of the secondary engine 602 via fuel line 741. Return fuel flows back to the fuel tank 720 via fuel lines 744, 745 and 746. An optional fuel heating valve 742 is shown in FIG. 12. If the fuel heating valve 742 is in winter setting, the fuel is heated in a fuel heating portion 735 of the heat exchanger 614. After heating, the fuel is then returned to the fuel tank 720 via fuel line 746. In summer setting, the return fuel bypasses the fuel heating portion 735 of the heat exchanger 614.

The temperature sensors 623 and 633 shown in FIG. 12 may be connected and provide input to the control system 608 (shown in FIGS. 10 and 11). The control system may use that input and activate or deactivate the coolant heater 622 and the lubricant heater 632 accordingly.

Figure 13:
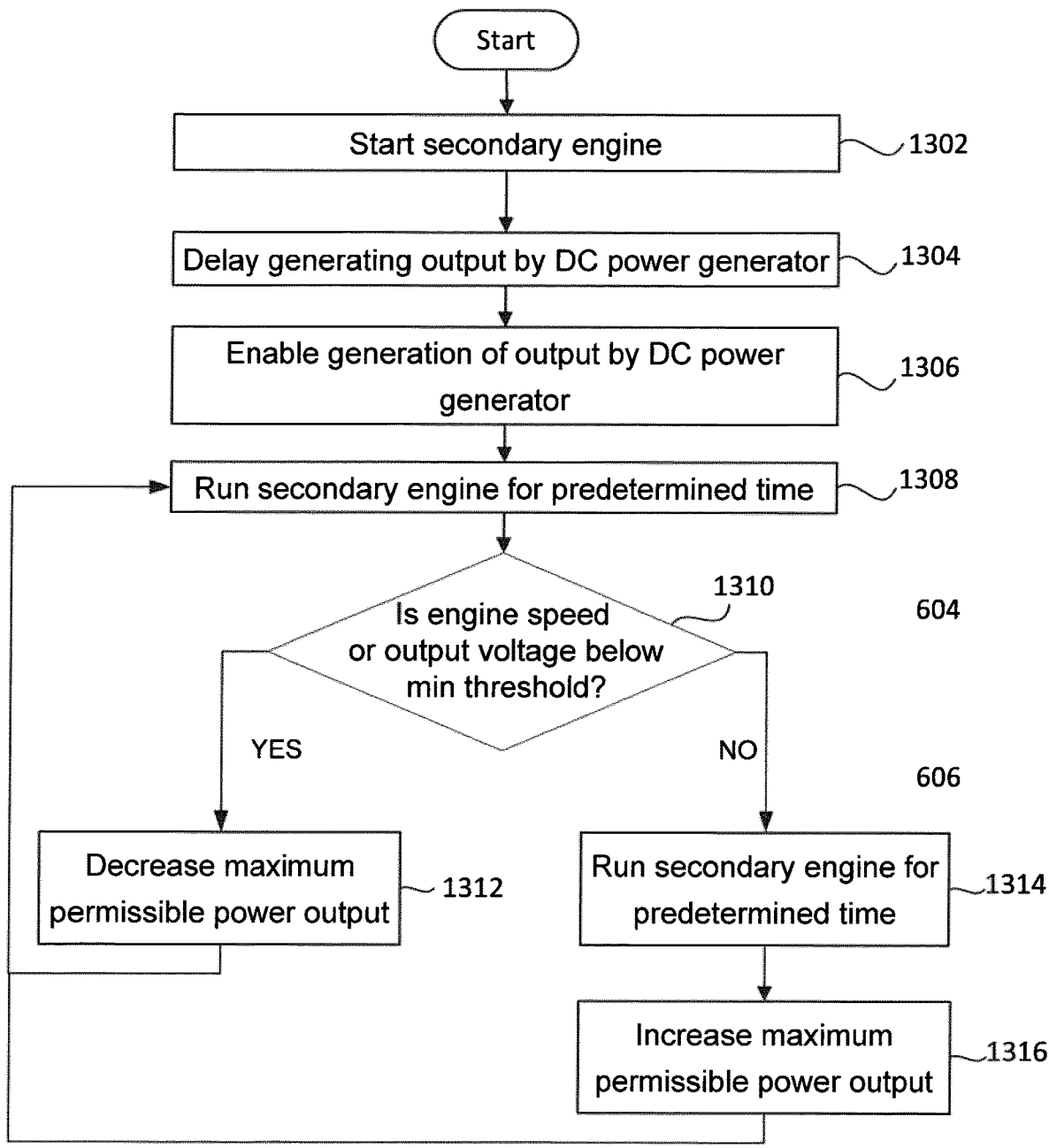
FIG. 13 is a flowchart of an example method of managing the power output of an APU according to some embodiments.

FIG. 13 is a flowchart of an example method 1300 of managing the power output of an APU (such as the APU 600 of FIGS. 10 to 12). However, it is to be understood that other methods or considerations for controlling APUs described herein may also be applied, and embodiments are not limited to the specific method of claim 13.

At block 1302, a secondary engine (such as secondary engine 602 of FIGS. 10 to 12) is started. The secondary engine may be started in response to a predetermined condition (e.g. primary engine shut down) as described above. The secondary engine may be allowed to warm up for a suitable period of time with no external loads other than (for example) the parasitic loads connected to its front and rear output shafts. Thus, in optional block 1304, output from the DC power generator is delayed. At block 1306, when the secondary engine reaches a minimum engine speed threshold (e.g. RPM threshold), the DC power generator is enabled to provide current. The generator may, for example, by enabled at a pre-determined maximum output (e.g. 75% output). The term "maximum output" in this context is the maximum allowed or permitted output of the DC power generator. The APU control system (e.g. control system 608 in FIG. 10) may sends "maximum allowed % output" signal to the generator's voltage regulator and the generator's voltage regulator may then only output up to this "maximum allowed % output". For example, assume that at a given speed and rpm, the generator can output 100 A. Thus, if the APU control system sends a 100% maximum allowed output message to the voltage regulator, it may output 100 A if the load on the generator is >=100 A. Then, if the APU control system were to determine that 50% maximum output should be allowed (perhaps since the engine speed was drooping too low or the voltage was drooping), the generator would only allow itself to output 50 A maximum. Thus, the term "maximum output" herein does not refer to the full capability of the DC power generator, but rather to the set maximum that the DC power generator is permitted to output. This setting may be stepped up or down as described herein.

Alternatively, output from the DC power generator is delayed for a predetermined amount of time after secondary engine startup. The delay of output from the DC power generator may be accomplished by any suitable electrical and/or mechanical switching means. Thus, the secondary engine may not be subject to external loads (via the DC power generator) until the engine is able to handle such loads. In some embodiments, there may be no delay and output from the DC power generator may be activated upon secondary engine startup. The DC power generator 610 of FIG. 10, for example, may be electronically controlled by the control system to not provide an excitation voltage to the DC power generator 610 (i.e. to an excitation winding) during start up and/or warm up cycles of the secondary engine 602. Similarly, no excitation voltage may be provided to disable DC voltage output prior to shut down and/or cool down cycles of the secondary engine 602.

Optionally, at block 1308, the secondary engine runs for a first predetermined amount of time. The engine speed and output voltage may be monitored during this time.

At block 1310, the engine speed (e.g. RPM) and generator output voltage are measured and compared to minimum (e.g. calibrated) speed and voltage thresholds. The comparison may factor in the base or set engine speed of the secondary engine, which is adjustable as described above. The minimum voltage threshold may also be adjustable based on a desired output voltage. The monitoring may be performed for a predetermined (e.g. calibrated) period of time before the comparison.

If the engine speed and/or output voltage are above the minimum thresholds ("yes" path, block 1310), then the method continues at block 1314. If the engine speed and/or output voltage are not above the minimum thresholds ("no" path, block 1310), then at block 1312 the generator's maximum power output is reduced by a predetermined amount (for example, from 75% to 50%). This power output step-down may reduce the load on the APU and, thus, enable the engine and DC power generator to function with the proper engine speed and voltage. The method returns to block 1310 and blocks 1308 to 1312 may be repeated until the engine speed and output voltage are both above the minimum thresholds.

At block 1314, the APU runs for a second predetermined (e.g. calibrated) period of time.

At block 1316, the generator's maximum power output is increased by a predetermined amount (for example, from 50% to 75%). After this power step-up, the method returns to block 1308. Blocks 1308 to 1316 may be repeated continuously (stepping up and/or down the APU power output) while the secondary engine runs to adaptively determine and provide the appropriate maximum output power for the current load on the APU. In some embodiments, the method may proceed from block 1316 to block 1310, rather than 1308.

By decreasing and increasing the maximum allowed power output of the DC power generator, the power output is thereby adapted based on current loads. If the APU is bogged down or drooping, the power is reduced to compensate, for example. Power output may be regulated by adjusting the excitation field in the DC power generator (to thereby adjust the maximum allowed power output).

In some embodiments, the engine speed may also be adjusted (manually or automatically) to adapt the output power. For example, if the APU includes an engine speed control, then the secondary engine may be sped up or slowed down to adjust power output from the DC power generator. In some embodiments, if maximum power output has not been able to reach 100% (or close to 100%) for a predetermined time, the engine speed of the secondary engine may be increased (e.g. using a mechanical-electrical device connecting the control system 608 to the engine speed control 640 of FIG. 10 as described above).

In some embodiments, the method may omit the engine start up steps described above. The method may comprise monitoring engine speed and/or voltage output of the generator. If either engine speed or voltage output is too low (i.e. below a minimum threshold), then the maximum power output of the DC power generator may be stepped down. If either engine speed and voltage output are each sufficient (i.e. not below a minimum threshold), then the maximum power output of the DC power generator may be stepped up. These steps may repeat from time to time (e.g. periodically) to adaptively adjust the power output of the DC power generator to present conditions. Engine speed may be similarly stepped up and stepped down based on measured loads, voltage output and/or engine speed.

An APU with a DC power generator may run on demand to: maintain primary engine coolant temperature; maintain the primary engine's battery charge; and/or the APU's battery charge. Furthermore, an APU with a DC power (e.g. 74 VDC) delivery system may supply power for electrical systems of a locomotive or other vehicle. For example, the APU may power locomotive cabin heater's and/or cabin air conditioning loads as well as other loads such as lights etc. The APU may use fuel from the locomotives fuel tank, and the APU may, thus, keep cycling on off for several days. The APU may also run in parallel with the primary engine to provide battery charge to the primary engine battery system (e.g. if a generator of the primary engine is malfunctioning) or if the APU battery requires charging. For instance, when the locomotive primary engine is running, its battery bank that is being charged by the primary engine's generator, may power air conditioning and/or heating loads in the locomotive cabin.

If an APU is equipped to the locomotive, when it is in its monitoring mode, it may start up when the primary engine's water coolant gets too close to its freezing point in order to circulate and heat up the primary engine's cooling water via the waste heat from the APU's engine. The APU may read the temperature of the primary engine's water coolant and if need be, turn on additional electric liquid heaters to raise the temperature of the primary engine's cooling water.

In cases where the APU can shut down the primary engine, for safety, the APU may perform a self-check before it shuts down the primary engine. The system may have an alarm function where the first alarm is triggered if the APU does not start or stops running for instance due to lack of fuel and the second alarm may be triggered if the primary engine water temperature gets below an acceptable threshold which is an appropriate amount higher than the trigger point for the built in temperature controlled cooling water dump valve.

When in monitoring mode, the APU system may read the locomotive's battery voltage and when that voltage falls below a calibratable or adjustable threshold, the APU may be activated in order to charge the locomotive battery system. Once this locomotive battery system is charged, the APU may be shut down. If the locomotive battery voltage drops again, the APU may start up again.

The system may be equipped with a communication link by cellular or satellite (e.g. GPS) that informs the base about its location and data such as battery voltage, temperatures and fault codes.

The APU system described herein (such as APU 600 in FIG. 10) may be built into a frame assembly, including the APU's secondary engine and DC power generator, coolant and/or lubricant heating system (e.g. pumps, heat exchanger, heaters, etc.). The APU system (optionally including the frame assembly) may be mounted inside a locomotive engine room or alternatively on a wall or the running board outside the engine room. Coolant and lubricant lines described herein may be flexible or stiff tubing.

The DC power generator may deliver voltage to the vehicle's electrical system via a direct connection to the locomotives common grid. The DC power generator's voltage may be the same as the vehicle's system, thus allowing the said generator to work in unison or replace the primary engine's auxiliary generator so that either the APU's generator or the primary engine's generator or both can provide power to the vehicles ancillary equipment such as the cabin air-conditioning systems, cabin heaters and the vehicles battery bank.

As discussed above, the DC power generator of an APU (e.g. APU 600 of FIG. 10) may be electronically controlled by the control system to keep the APU's engine speed from drooping under load by reducing the maximum output power from the DC generator based on the engine RPM droop and/or voltage droop. The DC generator's maximum output power may be incrementally increased to 100% over several steps as the rpm droop and voltage stabilize to the battery bank's reduced acceptance levels.

The engine speed control of an APU (e.g. engine speed control 640 in FIG. 10) may automatically adjust the engine speed or may receive user input to manually change the engine speed. The engine speed control may be set to variable steady state set points depending on the load conditions.

As part of the APU of claim 1, when the locomotive is equipped with an Engine Shutdown Timer (EST), an outdoor installed adjustable thermo-switch may be installed that will disable the EST's ability to shut down the ME if the ambient temperature is so low that the APU system cannot be relied on to prevent the locomotives liquid from freezing. The ME may still be manually stopped while the EST is disabled.

Various optional functions of the APU control system (e.g. control system 608 of FIG. 10) are described below. The control system may be coupled to or include sensors and have software to monitor the vehicle and/or primary engine. For example, the control system may monitor wheels as well as the primary engine's status (e.g. running or not running) in order to determine if the vehicle is parked and if the primary engine is idling or shut down. The control system may include a timer function able to determine if the engine has been idling for a set time. The control system may include software to enable it to start the APU in a safe way if it determines that the ME has been idling longer than a pre-set time. The control system may include means to determine that the APU is running in its warm up phase. The control system may include software and means to shut down the primary engine. The control system may be connected to an audible and/or visible signal system in the operator's cab and may have software and means to sound an alert signal prior to shutting down the primary engine. The control system may be connected to a cancellation switch enabling the operator to delay the shutdown procedure of the primary engine. The control system may include software and sensors enabling it to shut down the APU after the primary engine has been shut down unless the APU is needed to charge batteries or maintain temperatures of liquids. The control system may include manual overriding controls for startup and shutdown of the APU. The control system may include software and sensors in the APU engines system and the electric system able to shut down the APU should it lack coolant or oil pressure or be overheated or when the generator is producing too high or too low voltage for a period of time. The control system may include software and means to measure liquid temperatures in the system and start up the APU if temperatures drop below set levels and to stop the APU when temperatures have reached set levels. The control system may include software and sensors to monitor system voltage and start the APU to run for battery charging. The control system may include software to shut down the APU after battery charging has occurred for a preset time. The control system may include software and sensors to monitor the APU's battery voltage and to start the APU engine in order to charge the APU's battery via the APU's belt driven alternator. The control system may include software to determine if a low system voltage is due to low batteries, a steady low voltage or due to high loads such as starter motors for the main engine. In the case of temporary low voltage, the software will not attempt to start the APU to avoid nuisance starts. The control system may include software and means to monitor the APU engine's start and run functions, and if such functions malfunction the control system may activate an alarm system and send a message by cellular or satellite to a base station. The control system may include software and means to monitor the water temperature in the bottom and-coldest end-of the water (or other coolant) system and initiate a secondary alarm before the temperature goes so low the vehicle will dump its water. The water system may be protected by a wax or memory metal controlled dump valve in its coldest point. It may trigger at falling temperature before the water freezes and empty the entire water system. The control system described herein may store and operate software for optimizing the function of the entire system and may be re-configured for different locomotives.

In some embodiments, the fuel in the vehicle's (e.g. locomotive) fuel tank may be circulated by a fuel pump driven by electric or mechanical means when the APU runs. If the flow rate of the circulating fuel is higher than needed for combustion, the unburnt fuel may be returned to the vehicles tank. In cold conditions, the heat exchanger in the APUs coolant flow may be used to warm the fuel returning to the vehicles tank. A diverter valve may be used to make the fuel bypass the heat exchanger in summer condition (as described above).

In some embodiments, a coolant jacketed muffler may be mounted on the APU engine in order to cool the exhaust and its piping from the APU to improve the fuel to coolant waste heat efficiency. The coolant may be circulated by the APU engines built in pump.

In some embodiments, for vehicles with unfavourable heat balance to the primary engine, an additional coolant may be used with ab air radiator and/or blower that may be activated depending on the temperature of the APU coolant.

In some embodiments, the main electric system from the APU's generator and the vehicles auxiliary generator on the ME and the battery bank are the same potential. A same universal potential may be used onboard vehicle such that no voltage switches or controls are needed for distribution. The system may be self-regulating and the current may flow to the lowest potential while being supplied from the highest potential, irrespectively what user(s) and provider(s) are running.

The APU described herein (such as APU 600 in FIG. 10) may automatically match the output voltage of the DC power generator to the electrical grid or system of the vehicle comprising the primary engine. For example, in a locomotive, the APU may include a voltage sensor that senses the voltage level in the locomotive's electrical grid and adjusts the output voltage accordingly (possibly independent of engine speed). The voltage may be adjusted by a voltage regulator (such as the voltage regulator 646 in FIG. 10).

What has been described is merely illustrative of the application of the principles of the disclosure. Other arrangements and methods can be implemented by those skilled in the art without departing from the scope of the claims.

What is claimed is:

1. An auxiliary power system for operation in cooperation with a primary engine, the auxiliary power system comprising:
    a secondary engine having a secondary engine lube-oil system in fluid communication with a sump and a recirculating oil pump;
    a primary engine coolant heating system in fluid communication with the secondary engine;
    a primary engine lubricant heating system in fluid communication with the secondary engine lube-oil system, the recirculating oil pump, and the sump;
    a Direct Current (DC) power generator that generates a first output voltage, the DC power generator operably connected to the secondary engine;
    a voltage regulator that regulates the first output voltage of the DC power generator; and
    an engine speed control system that monitors an engine speed of the secondary engine and the first output voltage of the DC power generator, and adjusts a maximum permitted output power of the DC power generator responsive to at least one of the engine speed and the first output voltage, wherein adjusting the maximum permitted output power of the DC power generator comprises:

decreasing the maximum permitted output power if at least one of the engine speed is below an engine speed threshold and the first output voltage is below a voltage threshold; and increasing the maximum permitted output power if at least one of the engine speed is above the engine speed threshold and the first output voltage is above the voltage threshold for a first predetermined time period.

2. The auxiliary power system of claim 1, wherein the first output voltage of the DC power generator is adjusted with the voltage regulator to match a second output voltage of an electrical system of a vehicle comprising the primary engine.

3. The auxiliary power system of claim 2, wherein the vehicle is a locomotive.

4. The auxiliary power system of claim 1, wherein the voltage regulator is configured to maintain the first output voltage at approximately 74 VDC.

5. The auxiliary power system of claim 4, wherein the voltage regulator adjusts an excitation voltage in the DC power generator responsive to the first output voltage to regulate the first output voltage.

6. The auxiliary power system of claim 5, wherein adjusting the excitation voltage in the DC power generator responsive to the first output voltage comprises: increasing the excitation voltage if the first output voltage is below a minimum threshold; and decreasing the excitation voltage if the first output voltage is above a maximum threshold.

7. The auxiliary power system of claim 1, wherein the engine speed control system maintains the engine speed of the secondary engine based on an engine speed setting, the engine speed setting being adjustable within an engine speed range.

8. The auxiliary power system of claim 7, wherein the engine speed control system comprises an engine speed sensor that senses a current engine speed of the secondary engine, and a fuel regulator that increases fuel supplied to the secondary engine if the current engine speed falls below the engine speed setting by a first amount, and decreases the fuel supplied to the secondary engine if the current engine speed exceeds the engine speed setting by a second amount.

9. The auxiliary power system of claim 8, wherein the engine speed control system comprises a timer, and wherein the engine speed control system controls the voltage regulator to delay generating the first output voltage until at least one of: a preset time elapses after the secondary engine is started; and the engine speed corresponds to the engine speed setting.

10. The auxiliary power system of claim 1, wherein the engine speed control system further increases the engine speed if the maximum permitted output power does not reach a minimum power threshold within a second predetermined time period.

11. The auxiliary power system of claim 1, further comprising a temperature sensor coupled to a switch, the temperature sensor mountable to an exterior of a vehicle containing the primary engine, wherein the switch is configured to disable an automatic shutdown of the primary engine if a temperature sensed by the temperature sensor is below a temperature threshold.

12. The auxiliary power system of claim 11, wherein the switch disables the automatic shutdown of the primary engine by disabling an Engine Shutdown Timer (EST) of the vehicle.

13. The auxiliary power system of claim 1, wherein the engine speed control system controls the voltage regulator of the DC power generator to match the first output voltage of the DC power generator to a second output voltage of an electrical system of a vehicle.

14. A vehicle comprising the primary engine and the auxiliary power system of claim 1.

15. The vehicle of claim 14, wherein the vehicle is a locomotive.

16. The vehicle of claim 15, further comprising at least one of an electrical system and a battery bank, wherein the first output voltage of the DC power generator is adjusted with the voltage regulator to match at least one of a second output voltage of the electrical system of the vehicle and a third output voltage of the battery bank of the vehicle.

17. A method for controlling a power output of an auxiliary power system that cooperates with a primary engine, the auxiliary power system comprising a secondary engine and a Direct Current (DC) power generator, the DC power generator operably connected to the secondary engine and configured to generate a first output voltage, the secondary engine having a secondary engine lube-oil system in fluid communication with a sump, and a recirculating oil pump, the primary engine having a primary engine lubricant heating system in fluid communication with the secondary engine, the recirculating oil pump, and the sump, the method comprising:

monitoring, with an engine speed control system, an engine speed of the secondary engine and the first output voltage of the DC power generator; and adjusting, with a voltage regulator, a maximum permitted output power of the DC power generator responsive to at least one of the engine speed and the first output voltage, wherein adjusting the maximum permitted output power of the DC power generator comprises:

decreasing the maximum permitted output power if at least one of the engine speed is below an engine speed threshold and the first output voltage is below a voltage threshold; and increasing the maximum permitted output power if at least one of the engine speed is above the engine speed threshold and the first output voltage is above the voltage threshold for a first predetermined time period.

18. The method of claim 17, further comprising: increasing an engine speed setting of the secondary engine if the maximum permitted output power does not reach a power threshold within a second predetermined time period.

19. The method of claim 18, further comprising delaying generating the first output voltage from the DC power generator until at least one of:

a preset time elapses after the secondary engine is started; and the engine speed corresponds to the engine speed setting.

20. The method of claim 17, wherein the auxiliary power system and the primary engine are in a vehicle.

21. The method of claim 20, wherein the vehicle is a locomotive.

22. An auxiliary power system for operation in cooperation with a primary engine, the auxiliary power system comprising:

a secondary engine;

at least one of: a primary engine coolant heating system in fluid communication with the secondary engine; and a primary engine lubricant heating system in fluid communication with the secondary engine;

a Direct Current (DC) power generator that generates a first output voltage, the DC power generator operably connected to the secondary engine;

a voltage regulator that regulates the first output voltage of the DC power generator;

an engine speed control system that monitors an engine speed of the secondary engine and the first output voltage of the DC power generator and adjusts a maximum permitted output power of the DC power generator responsive to at least one of the engine speed and the first output voltage; and a temperature sensor coupled to a switch, the temperature sensor mountable to an exterior of a vehicle containing the primary engine, wherein the switch is configured to disable an automatic shutdown of the primary engine if a temperature sensed by the temperature sensor is below a temperature threshold by disabling an Engine Shutdown Timer (EST) of the vehicle.

23. The auxiliary power system of claim 22, wherein the first output voltage of the DC power generator is adjusted with the voltage regulator to match a second output voltage of an electrical system of the vehicle.

24. The auxiliary power system of claim 23, wherein the vehicle is a locomotive.

25. The auxiliary power system of claim 22, wherein the voltage regulator is configured to maintain the first output voltage at approximately 74 VDC.

26. The auxiliary power system of claim 22, wherein the voltage regulator adjusts an excitation voltage in the DC power generator responsive to the first output voltage to regulate the first output voltage.

27. The auxiliary power system of claim 26, wherein adjusting the excitation voltage in the DC power generator responsive to the first output voltage comprises: increasing the excitation voltage if the first output voltage is below a minimum threshold; and decreasing the excitation voltage if the first output voltage is above a maximum threshold.

28. The auxiliary power system of claim 22, wherein the engine speed control system maintains the engine speed of the secondary engine based on an engine speed setting, the engine speed setting being adjustable within an engine speed range.

29. The auxiliary power system of claim 28, wherein the engine speed control system comprises an engine speed sensor that senses a current engine speed of the secondary engine, and a fuel regulator that increases fuel supplied to the secondary engine if the current engine speed falls below the engine speed setting by a first amount; and decreases the fuel supplied to the secondary engine if the current engine speed exceeds the engine speed setting by a second amount.

30. The auxiliary power system of claim 28, wherein the engine speed control system comprises an engine speed timer, and the engine speed control system controls the voltage regulator to delay generating the first output voltage until at least one of: a preset time elapses after the secondary engine is started; and the engine speed corresponds to the engine speed setting.

31. The auxiliary power system of claim 28, wherein adjusting the maximum permitted output power of the DC power generator responsive to the at least one of the engine speed and the first output voltage comprises:

decreasing the maximum permitted output power if at least one of:
the engine speed is below an engine speed threshold and
the first output voltage is below a voltage threshold; and
increasing the maximum permitted output power if at least one of:
the engine speed is above the engine speed threshold and
the first output voltage is above the voltage threshold for a first predetermined time period.

32. The auxiliary power system of claim 31, wherein the engine speed control system further increases the engine speed if the maximum permitted output power does not reach a minimum power threshold within a second predetermined time period.

33. The auxiliary power system of claim 22, wherein the engine speed control system controls the DC power generator with the voltage regulator to match the first output voltage of the DC power generator to a second output voltage of an electrical system of the vehicle.

34. A vehicle comprising the primary engine and the auxiliary power system of claim 22.

35. The vehicle of claim 34, wherein the vehicle is a locomotive.

36. The vehicle of claim 34, further comprising at least one of an electrical system and a battery bank, wherein the first output voltage of the DC power generator is adjusted with the voltage regulator to match at least one of a second output voltage of the electrical system of the vehicle and a third output voltage of the battery bank of the vehicle.

37. A method for controlling a power output of an auxiliary power system that cooperates with a primary engine, the auxiliary power system comprising a secondary engine, a Direct Current (DC) power generator operably connected to the secondary engine and configured to generate a first output voltage, and a temperature sensor coupled to a switch, the temperature sensor mountable to an exterior of a vehicle containing the primary engine, wherein the switch is configured to disable an automatic shutdown of the primary engine if a temperature sensed by the temperature sensor is below a temperature threshold by disabling an Engine Shutdown Timer (EST) of the vehicle, the method comprising:

monitoring, with an engine speed control system, an engine speed of the secondary engine and the first output voltage of the DC power generator; and adjusting, with a voltage regulator, a maximum permitted output power of the DC power generator responsive to at least one of the engine speed and the first output voltage.

38. The method of claim 37, wherein adjusting the maximum permitted output power of the DC power generator responsive to the at least one of the engine speed and the first output voltage comprises:

decreasing the maximum permitted output power if at least one of:
the engine speed is below an engine speed threshold and
the first output voltage is below a voltage threshold; and
increasing the maximum permitted output power if at least one of:
the engine speed is above the engine speed threshold and
the first output voltage is above the voltage threshold for a first predetermined time period.

39. The method of claim 38, further comprising: increasing an engine speed setting of the secondary engine if the maximum permitted output power does not reach a power threshold within a second predetermined time period.

40. The method of claim 39, further comprising delaying generating the first output voltage from the DC power generator until at least one of:

a preset time elapses after the secondary engine is started; and the engine speed corresponds to the engine speed setting.

41. The method of claim 37, wherein the auxiliary power system and the primary engine are contained in the vehicle.

42. The method of claim 41, wherein the vehicle is a locomotive.

* * * * *